US006633782B1

(12) United States Patent
Schleiss et al.

(10) Patent No.: US 6,633,782 B1
(45) Date of Patent: Oct. 14, 2003

(54) DIAGNOSTIC EXPERT IN A PROCESS CONTROL SYSTEM

(75) Inventors: Trevor D. Schleiss, Austin, TX (US); Mark Nixon, Round Rock, TX (US); Terrence Lynn Blevins, Round Rock, TX (US); Todd B. Brase, Austin, TX (US); Suresh Ganesamoorthi, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/499,445

(22) Filed: Feb. 7, 2000

Related U.S. Application Data

(63) Continuation of application No. 09/256,585, filed on Feb. 22, 1999, now Pat. No. 6,298,454.
(60) Provisional application No. 60/160,101, filed on Oct. 18, 1999.

(51) Int. Cl.$^7$ .............................................. G05B 11/01
(52) U.S. Cl. ............................ 700/26; 700/18; 700/23; 700/28; 700/52; 700/53; 700/86; 714/37; 714/38; 714/46; 714/47; 702/183; 702/184; 702/185
(58) Field of Search ............................ 700/18–23, 17, 700/26–28, 48–53, 86–88, 83; 714/37, 38, 46, 47, 25; 702/183, 184, 185

(56) References Cited

U.S. PATENT DOCUMENTS

| 3,096,434 A | 7/1963 | King ........................... 235/151 |
| 3,404,264 A | 10/1968 | Kugler ......................... 235/194 |
| 3,701,280 A | 10/1972 | Stroman ........................ 73/194 |
| RE29,383 E | 9/1977 | Gallatin et al. ................ 137/14 |
| 4,058,975 A | 11/1977 | Gilbert et al. ............... 60/39.28 |
| 4,099,413 A | 7/1978 | Ohte et al. ..................... 73/359 |

(List continued on next page.)

FOREIGN PATENT DOCUMENTS

| DE | 35 40204 C1 | 9/1986 |
| DE | 40 08 560 A1 | 9/1990 |
| DE | 44 33 593 A1 | 6/1995 |
| DE | 195 02 499 A1 | 8/1996 |
| EP | 0 122 622 | 10/1984 |
| EP | 6 400 1914 | 1/1989 |
| EP | 0 362 386 | 4/1990 |
| EP | 0 377 736 | 7/1990 |

(List continued on next page.)

OTHER PUBLICATIONS

Gensym Corporation Web Page, Home, www.gensym.com, 1 page.
Gensym Corporation Web Page, Products, "A Strategic Choice for Improving Business Operations," www.gensym.com/products/g2.htm, 6 pages.
Gensym Corporation Web Page, Products, "Software for Maintaining the Availability and Performance of Processes," www.gensym.com.products/g2diagosticassistant.com, 4 pages.

(List continued on next page.)

*Primary Examiner*—Ramesh Patel
(74) *Attorney, Agent, or Firm*—Marshall, Gerstein & Borun

(57) ABSTRACT

A diagnostic system for use in a process control system collects and stores in a database information pertaining to the operation of the process control system, and that uses an expert engine to apply rules for analysis to the information in the database to determine solutions to problems. The database stores various types of information such as event and alarm data, notices of scheduled maintenance and changes to operating parameters, and historical data related to previous changes to the process control system that are relevant to determining both the source of the problems detected in the process control system and the steps necessary to either further analyze or correct the detected problems. The diagnostic system identifies the source of the problem and identifies and runs the appropriate analytical tools or takes remedial measures based on the rules for analysis for the expert engine.

60 Claims, 7 Drawing Sheets

U.S. PATENT DOCUMENTS

| | | | |
|---|---|---|---|
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,311,562 A | 5/1994 | Palusamy et al. | 376/215 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,390,287 A | 2/1995 | Obata | 395/67 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,440,478 A | 8/1995 | Fisher et al. | 364/188 |
| 5,467,355 A | 11/1995 | Umeda et al. | 364/571.04 |
| 5,469,735 A | 11/1995 | Watanabe | 73/118.1 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,500,941 A | 3/1996 | Gil | 714/38 |
| 5,511,004 A | 4/1996 | Dubost et al. | 364/551.01 |
| 5,548,528 A | 8/1996 | Keeler et al. | 364/497 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,598,521 A | 1/1997 | Kilgore et al. | 395/326 |
| 5,600,148 A | 2/1997 | Cole et al. | 250/495.1 |
| 5,625,574 A | 4/1997 | Griffiths et al. | 364/550 |
| 5,640,491 A | 6/1997 | Bhat et al. | 395/22 |
| 5,671,335 A | 9/1997 | Davis et al. | 395/23 |
| 5,671,351 A | 9/1997 | Wild et al. | 714/38 |
| 5,675,504 A | 10/1997 | Sérodes et al. | 364/496 |
| 5,704,011 A | 12/1997 | Hansen et al. | 395/22 |
| 5,781,878 A | 7/1998 | Mizoguchi et al. | 701/109 |
| 5,848,365 A | 12/1998 | Coverdill | 701/35 |
| 5,909,368 A * | 6/1999 | Nixon et al. | 700/131 |
| 5,995,916 A | 11/1999 | Nixon et al. | 702/182 |
| 6,014,612 A | 1/2000 | Larson et al. | 702/183 |
| 6,195,591 B1 * | 2/2001 | Nixon et al. | 700/19 |
| 6,260,004 B1 * | 7/2001 | Hays et al. | 702/130 |
| 6,317,701 B1 * | 11/2001 | Pyotsia et al. | 340/825.49 |
| 6,445,963 B1 * | 9/2002 | Blevins et al. | 700/19 |

FOREIGN PATENT DOCUMENTS

| | | |
|---|---|---|
| EP | 0 413 814 A1 | 2/1991 |
| EP | 0 487 419 A2 | 5/1992 |
| EP | 0 594 227 A1 | 4/1994 |
| EP | 0 624 2192 | 9/1994 |
| EP | 0 624 847 A1 | 11/1994 |
| EP | 0 644 470 A2 | 3/1995 |
| EP | 0 723 4988 | 9/1995 |
| EP | 0 827 096 A2 | 3/1998 |
| FR | 2 334 827 | 12/1976 |
| GB | 928704 | 6/1963 |
| JP | 58-129316 | 8/1983 |
| JP | 59-116811 | 7/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 62-30915 | 2/1987 |
| JP | 64-1914 | 1/1989 |
| JP | 64-72699 | 3/1989 |
| JP | 2-5105 | 1/1990 |
| JP | 5-122768 | 5/1993 |
| JP | 7-63586 | 3/1995 |
| JP | 8-54923 | 2/1996 |
| JP | 8-136386 | 5/1996 |
| JP | 8-166309 | 6/1996 |
| JP | 08-314538 | 11/1996 |
| JP | 10-011292 | 1/1998 |
| JP | 10-301619 | 11/1998 |
| WO | WO 94/25933 | 11/1994 |
| WO | WO 97/2115 | 6/1997 |
| WO | WO 98/14848 | 4/1998 |
| WO | WO 98/14853 | 4/1998 |
| WO | WO 98/14855 | 4/1998 |

OTHER PUBLICATIONS

Great Britain Search Report for GB 0001440.7 (corresponding to U.S. Ser. No. 09/256,585) dated May 11, 2000.

Alguindigue et al., "Using Artificial Neural Networks to Identify Nuclear Power Plant States," *The University of Tennessee Department of Nuclear Engineering*, pp. 1–4.

Berkan et al., "Fuzzy Logic and Artificial Neural Networks for Nuclear Power Plant Applications," *Proceedings of the American Power Conference*, 5 pages.

Blalock et al., "A Decade of Progress in High Temperature Johnson Noise Thermometry," *American Institute of Physics*, pp. 1219–1223, 1982.

Blalock et al., "Johnson Noise Power Thermometer and Its Application in Process Temperature Measurement," *American Institute of Physics*, pp. 1249–1259, 1982.

Blalock et al., "Survey, Applications, and Prospects of Johnson Noise Thermometry," *University of Tennessee Electrical Engineering Department*, 13 pages, Mar. 31, 1981.

Boland, "Smart Field Devices Provide New Process Data, Increase System Flexibility," *I & CS*, pp. 45–51, Nov. 1994.

Borkowski et al., "A New Method of Johnson Noise Thermometry," *Rev. Sci. Instrum.*, vol. 45, No. 2, pp. 151–162, Feb., 1974.

Boynton, "Sensor and Device Diagnostics for Predictive and Proactive Maintenance," *Electric Power Research Institute—Fossil Plant Maintenance Conference*, pp. 50–1 to 50–6, Jul. 29, 1996.

Brixy et al., "Noise Thermometry for Industrial and Metrological Applications at KFA Jvlich," *The 7th International Symposium on Temperature Its Measurement and Control in Science and Industry*, 4 pages, Apr. 28, 1992.

Cleaveland, "Field–Based Architecture is Based on Open Systems, Improves Plant Performance," *I & CS*, pp. 73–74, Aug. 1996.

de Groot et al., "Development of a Resistance Thermometer for Use Up to 1600° C.," *Cal Lab*, Jul.–Aug. 1996.

DeltaV™, "DeltaV–Site Map," 1 page, Nov. 1, 1999.

DeltaV™, "DeltaV Home Page," p. 1 of 2, Nov. 1, 1999.

DeltaV™, "DeltaV–Backgrounder," p. 1 of 2, Nov. 1, 1999.

DeltaV™, "DeltaV–FAQs," 3 pages, Nov. 1, 1999.

DeltaV™, "DeltaV Version 4.2," 3 pages, Nov. 1, 1999.

Desborough et al., "Performance Assessment Measures for Univariate Feedback Control," *The Canadian Journal of Chemical Enginneering*, vol. 70, pp. 1186–1197, Dec. 1992.

Desborough et al., "Perfomance Assessment Measures for Univariate Feedforward/Feedback Control," *The Canadian Journal of Chemical Engineering*, vol. 71, pp. 605–616, Aug. 1993.

Electric Power Institute, "in Situ Calibration of Nuclear Plant Platinum Resistance Thermometers Using Johnson Noise Methods," EPRI Project 1440–1 Final Report, Jun. 1983.

Eryvrek et al., "Neural Networks for Sensor Validation and Plantwide Monitoring," *Nuclear Europe Worldscan vol. XII*, No. 1–2, 4 pages, Feb. 1992.

Eryvrek et al., "Parallel, Fault–Tolerant Control and Diagnostics System for Feedwater Regulation in PWRS," *Proceedings of the American Power Conference*, 6 pages.

Eryvrek et al., "Sensor Validation for Power Plants Using Adaptive Backpropagation Neural Network," *IEEE Transactions on Nuclear Science*, vol. 31 No. 2, pp. 1040–1047, Apr. 1990.

Eryvrek et al., "Software–Based Fault–Tolerance Control Design for Improved Power Plant–Operation IEEE/IFAC Joint Symposium on Computer–Aided Control System Design," pp. 585–590, 1994.

Fisher Rosemount Systems, Inc., "DeltaV Book Online," 1996.

Foxboro Company, "Foxboro Company, Pharmaceutical Industry," 10 pages, Sep. 8, 1998.

Frank et al., "Fuzzy Logic and Neural Network Applications to Fault Diagnosis," *International Journal of Approximate Reasoning*, vol. 16, pp. 67–88, 1997.

Harris, T., "Assessment of Control Loop Performance," *The Canadian Journal of Chemical Engineering*, vol. 67, pp. 856–861, Oct. 1989.

Harris et al., "Performance Assessment of Multivariable Feedback Controllers," *Automatica*, vol. 32, No. 11, pp. 1505–1518, 1996.

Hashemian et al., "In–Situ Response Time testing of Thermocouples," pp. 587–593, 1989.

Hashiguchi, "Measurement of the Temperature Fluctuation in a Resistor Generating l/f Fluctuation," *362 Japanese Journal of Applied Physics*, vol. 22, pp. L284–L286, May 1983.

Henry, "A Fault–Tolerant Interface for Self–Validating Sensors," *IEEE Colloquium on Condition Monitoring and Fault Tolerance*, 3 pages, Nov. 1990.

Henry, "'Intelligent' Behaviour for Self–Validating Sensors," *Advances in Measurement*, pp. 1–7.

Henry, "Keynote Paper: Hardware Compilation—A New Technique for Rapid Prototyping of Digital Systems—Applied to Sensor Validation," *Control Engineering Practice*, vol. 3, No. 7, pp. 907–924, 1995.

Henry, "Signal Processing, Data Handling and Communications: The Case for Measurement Validation," 9 pages.

Henry et al., "A Standard Interface for Self–Validating Sensors," *Report No. OUEL 1884/91, Department of Engineering Science*, 17 pages, 1991.

Henry et al., "The Implications of Digital Communications on Sensor Validation," *Report No. OUEL 1912/92, Department of Engineering Science*, 7 pages, 1992.

Henry et al., "Programmable Hardware Architectures for Sensor Validation," *Control Engineering Practice*, vol. 4, No. 10, pp. 1339–1354, 1996.

Huang, et al., "Good, Bad or Optimal? Performance Assessment of Multivariable Processes," *Automatica*, vol. 33, No. 66, pp. 1175–1183, 1997.

Kerlin et al., "Smart Temperature Measurement in the '90s," C & I, 3 pages.

Kisilevskii et al., "Check of Semiconductor Thermal Resistance Elements By the Method of Noise Thermometry," *Measurement Techniques*, vol. 25, No. 3, pp. 244–246, Mar. 1982.

Love et al., "A Knowledge–Based Approach for Detection and Diagnosis of Out–of–Control Events in Manufacturing Processes," *IEEE*, pp. 736–741, 1989.

Lowry et al., "The Performance of Control Charts for Monitoring Process Variation," *Commun. Statist.—Simula.*, 24(2), pp. 409–437, 1995.

Massiha et al., "Detection of Hot Spots in Thin Metal Films Using an Ultra Sensitive Dual Channel Noise Measurement System," *IEEE Proceedings vol. 3, Energy and Information Technologies in the Southeast* pp. 1309–1314, Apr. 9, 1989.

Matrikon Consulting Inc., "Welcome to Matrikon," 1 page, Sep. 1, 1998.

Matrikon Consulting Inc., "Welcome to Matrikon Consulting Inc.: Process Information and Expert Systems," 1 page, Sep. 1, 1998.

Matrikon Consulting Inc., "Welcome to Matrikon Consulting Inc.: Control and Automation," 1 page, Sep. 1, 1998.

Matrikon ProcessDoc, "Matrikon Application Products—ProcessDoc," 2 pages, Sep. 1, 1998.

Matrikon Process Doc, "ProcessDoc—Alarm Management," 1 page, Sep. 1, 1998.

Matrikon ProcessDoc, "ProcessDoc—Audit Your Control Loops," 1 page, Sep. 1.

Matrikon ProcessDoc, "ProcessDoc—Monitor Your Process," 1 page, Sep. 1, 1998.

Matrikon ProcessDoc, "ProcessDoc—Non–Intrusive Operation," 2 pages, Sep. 1, 1998.

Matrikon ProcessDoc, "prodoc.pdf at www.matrikon.com," page 1 of 2, Sep. 1, 1998.

Matrikon Systems, Inc., "Welcome to Matrikon Systems," 1 page, Sep. 1, 1998.

Newland, "Wavelet Analysis of Vibration, Part 1: Theory[1]," *Journal of Vibration and Acoustics*, vol. 116, pp. 409–416, Oct. 1994.

Newland, "Wavelet Analysis of Vibration, Part 2: Wavelet Maps," *Journal of Vibration and Acoustics*, vol. 116, pp. 417–425, Oct. 1994.

Oakes et al., "Johnson Noise Thermometer for High–Radiation and High–Temperature Environments," *Manuscript for the Fifth Symposium on Space Nuclear Power Systems*, 14 pages, Jan. 1988.

Orrison, G., "Taking Full Advantage of Smart Transmitter Technology Now," *699 Control Engineering*, pp. 59–61, Jan. 1995.

Qin, "Control Performance Monitoring—A Review and Assessment," *NSF/NIST Workshop*, pp. 173–186, Mar. 6–8, 1998.

Rhinehart, R., "A CUSUM Type On–Line Filter," *Department of Chemical Engineering MS–3121*, pp. 169–176, 1992.

Roberts et al., "Application of Johnson Noise Thermometry to Space Nuclear Reactors," *6th Symposium on Space Nuclear Power Systems*, 10 pages, Jan. 1989.

Roberts et al., "Tuned–Circuit Johnson Noise Thermometry," *7th Symposium on Space Nuclear Power Systems*, 7 pages, Jan. 1990.

Shephard et al., "Development of a Long–Life High–Reliability Remotely Operated Johnson Noise Thermometer," *Advances In Instrumentation and Control*, pp. 77–84, Oct. 1991.

Shepard et al., "Tuned–Circuit Dual–Mode Johnson Noise Thermometers," *7th ITS*, 3 pages, Apr. 1992.

Shunta, "Achieving World Class Manufacturing Through Process Control," Prentice Hall PTR, pp. vii–202, 1995.

Taya et al., "Detecting Blockage in Process Connections of Differential Pressure Transmitters," *SICE '95*, pp. 1605–1608, 1995.

Upadhyaya et al., "An Integrated Architecture for Signal Validation in Power Plants," *Third IEEE International Symposium on Intelligent Control*, pp. 1–6, Aug. 1988.

Upadhyaya et al., "Application of Neural Computing Paradigms for Signal Validation," *Department of Nuclear Engineering*, pp. 1–18.

Upadhyaya et al., "Application of Neural Networks for Sensor Validation and Plant Monitoring," *Nuclear Technology*, vol. 97, pp. 169–176, Feb. 1992.

Upadhyaya et al., "Automated Generation of Nonlinear System Characterization for Sensor Failure Detection," *Nuclear Engineering Department*, pp. 269–274, 1989.

Upadhyaya et al., "Development and Application of Neural Network Algorithms for Process Diagnostics," *Proceedings of the 29th Conference on Decision and Control*, pp. 3277–3282, 1990.

Upadhyaya et al., "Integration of Multiple Signal Validation Modules for Sensor Monitoring," *Manuscript for the 8th Symposium on Space Nuclear Power Systems*, pp. 1–6, Jul. 1990.

Upadhyaya et al., "Neural Networks for Sensor Validation and Plant Monitoring," *International Fast Reactor Safety Meeting*, pp. 1–10, Aug. 1990.

VanDoren, "Software Review: Analysis Software Answers Performance Questions," *Control Engineering*, 2 pages, Apr. 1998.

Weisman, "On–Line Statistical Process Control for a Glass Tank Ingredient Scale," *IFAC Real Time Programming*, pp. 29–38, 1980.

US 2002/00777111 A1, Nixon et al., Jan. 20, 2002, Fusion of process Performance Monitoring with Process Equipment Monitoring and Control.*

Great Britain Search Report for GB 0003975.0 (corresponding to U.S. Ser. No. 09/499,446) dated Jun. 16, 2000.

Great Britain Search Report for GB 0004093.1 (corresponding to U.S. Ser. No. 09/499,445) dated Jun. 16, 2000.

Japanese Notice of Reason of Rejection for Japanese Patent Application No. 2000–092436, mailed Mar. 18, 2003, along with English–language translation.

* cited by examiner

DIAGNOSTIC EXPERT IN A PROCESS CONTROL SYSTEM

RELATED APPLICATION

This application claims priority to co-pending U.S. Provisional Application Ser. No. 60/160,101 filed Oct. 18, 1999 and is a continuation of U.S. application Ser. No. 09/256,585, filed Feb. 22, 1999 now U.S. Pat. No. 6,298,454.

FIELD OF THE INVENTION

The present invention relates generally to process control systems and, more particularly, to the automatic detection, analysis, and correction of problems existing within function blocks, devices and loops of a process control system.

DESCRIPTION OF THE RELATED ART

Process control systems, like those used in chemical, petroleum or other processes, typically include a centralized process controller communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 ma signals were limited in nature in that they were indicative of measurements made by the device or of control signals generated by the controller required to.control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, WORLDFIP®, Device-Net®, and CAN protocols, have been developed to enable smart field devices made by different manufacturers to be used together within the same process control network.

Moreover, there has been a move within the process control industry to decentralize process control functions. For example, the all-digital, two-wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In particular, each Fieldbus field device is capable of including and executing one or more function blocks, each of which receives inputs from and/or provides outputs to other function blocks (either within the same device or within different devices), and performs some process control operation, such as measuring or detecting a process parameter, controlling a device or performing a control operation, such as implementing a proportional-derivative-integral (PID) control routine. The different function blocks within a process control system are configured to communicate with each other (e.g., over a bus) to form one or more process control loops, the individual operations of which are spread throughout the process and are, thus, decentralized.

With the advent of smart field devices, it is more important than ever to be able to quickly diagnose and correct problems that occur within a process control system, as the failure to detect and correct poorly performing loops and devices leads to sub-optimal performance of the process, which can be costly in terms of both the quality and the quantity of the product being produced. Many smart devices currently include self-diagnostic and/or calibration routines that can be used to detect and correct problems within the device. For example, the FieldVue and ValveLink devices made by Fisher Controls International Inc. have diagnostic capabilities that can be used to detect certain problems within those devices and also have calibration procedures that can be used to correct problems, once detected. However, an operator must suspect that a problem exists with the device before he or she is likely to use such diagnostic or calibration features of the devices. There are also other process control tools, such as auto-tuners that can be used to correct poorly tuned loops within a process control network. Again, however, it is necessary to identify a poorly operating loop before such auto-tuners can be used effectively. Similarly, there are other, more complex, diagnostic tools, such as expert systems, correlation analysis tools, spectrum analysis tools, neural networks, etc. which use process data collected for a device or a loop to detect problems therein. Unfortunately, these tools are data intensive and it is practically impossible to collect and store all of the high speed data required to implement such tools on each process control device or loop of a process control system in any kind of systematic manner. Thus, again, it is necessary to identify a problem loop or a device before being able to effectively use these tools.

Still further, each device or function block within a smart process control network typically detects major errors that occur therein and sends a signal, such as an alarm or an event, to notify a controller or a host device that an error or some other problem has occurred. However, the occurrence of these alarms or events does not necessarily indicate a long-term problem with the device or loop that must be corrected, because these alarms or events may be generated in response to (or be caused by) other factors that were not a result of a poorly performing device or loop. Thus, the fact that a device or a function block within a loop generates an alarm or event does not necessarily mean that the device or loop has a problem that needs to be corrected. On the other hand, many devices can have problems without the problem rising to the level of severity to be detected as an alarm or an event.

To initially detect problems within the process control system, a process control operator or technician generally has to perform a manual review of data generated within a process control system (such as alarms and events, as well as other device and loop data) to identify which devices or loops are operating sub-optimally or are improperly tuned. This manual review requires the operator to have a great deal of expertise in detecting problems based on raw data and, even with such expertise, the task can be time-consuming at best and overwhelming at worst. For example, an instrumentation department of even a medium-sized operating plant may include between 3,000 and 6,000 field devices such as valves and transmitters. In such an environment, the instrument technician or control engineer responsible for a process area simply does not have the time to review the operation of all the field device instrumentation and control loops to detect which loops or devices may not be operating properly or may have some problem therein. In fact, because of limited manpower, the only devices usually scheduled for maintenance are those that have degraded to the point that they dramatically impact the quantity or quality of the product being produced. As a result, other devices or loops which need to be returned or which otherwise have a problem therein that could be corrected using the tools at hand are not corrected, leading to the overall degraded performance of the process control system.

Even after the under-performing devices and control loops are identified and the necessary diagnostics, tuners and other tools are available to further analyze and correct the problem, the user must possess the requisite knowledge and experience to select the appropriate tool and to use the tool correctly to resolve the problem. In some cases, the user may not have sufficient technical knowledge or practical experience to resolve the problem. Despite having tools available which display problems in the process control system and which recommend further diagnostic tools and remedial measures, the user may need further assistance to effectively monitor the process and correct problems.

In order to effectively monitor the process control network, the user must be knowledgeable about the process, the field devices, and the tools available to diagnose and correct problems in the process control network. Even if the user is familiar with the field devices and the tools, the user may not have ready access to all of the relevant data, such as event data, trending data, historical change and maintenance data for the device and process, and the like. Moreover, the user at the operator workstation is not typically an expert on the processes and the field devices. As a result, even though the system may provide some information regarding under-performing field devices and control loops, and suggest tools to diagnose and correct problems, there may still be an overwhelming amount of relevant information to evaluate in order to identify the source of the problems and to implement the measures necessary to correct the problem.

SUMMARY OF THE INVENTION

A diagnostic system for use in a process control system collects and stores data pertaining to the operation of the process control system in a database, and uses an expert engine to apply rules for analysis to the information in the database to determine solutions to problems in the process control system. The database stores various types of information that are relevant to determining both the source of the problems detected in the process control system and the steps necessary to either further analyze or correct the detected problems. The information in the database includes data pertaining specifically to the detected problem and to the field device, function block or control loop in which the detected problem exists. The database may also store event and alarm data, such as notices of scheduled maintenance and changes to operating parameters, that is relevant to identifying the source of the problem and to identifying the appropriate analytical and remedial measures. The database may also contain historical data related to previous changes to the process control system to correct previously detected problems.

When a problem is detected, the expert engine applies the rules for analysis to the relevant data in the database. As part of the analysis, the rules may dictate that the expert engine invoke additional analysis applications that are available on the process control network. The analysis applications may include tuners, calibrators, diagnostics tools, or any other applications that may be useful in analyzing and/or correcting the detected problem.

The diagnostic system may further include a user interface to which information is transmitted by the expert engine to notify the user of the detected problem. The expert engine may also transmit additional information, if available, regarding recommended courses of action to further analyze and/or correct the detected problem. For example, the expert engine may recommend the use of a further diagnostic tool to pinpoint the source of the detected problem. Alternatively, the expert engine may provide a recommendation to modify the process control system, such as changing the value of a parameter or changing the logic in a control loop. If requested to do so, the expert engine may also execute the recommended tools or guide the user through the steps necessary to implement a recommended change.

In this manner, the diagnostic system uses all the available relevant information to analyze the detected problem and to arrive at a recommended solution to the problem. The expert engine preferably runs continuously in the background to address problems as they arise, but may also be initiated by a user, a triggering event or an automatic scheduler so that the problems are addressed in an efficient manner. The operation of the expert engine saves time on the part of the user and does not require the user to have a great deal of expertise in solving problems in control loops and devices. Moreover, the diagnostic system is able to accumulate and analyze all the data that is relevant to solving the detected problem more quickly and efficiently. Besides saving time, the diagnostic system reduces the burden on the user and helps assure that the proper diagnostics tools and remedial measures are used in each circumstance and that these tools are implemented correctly.

DESCRIPTION OF THE PREFERRED EMBODIMENTS

Figure 1:
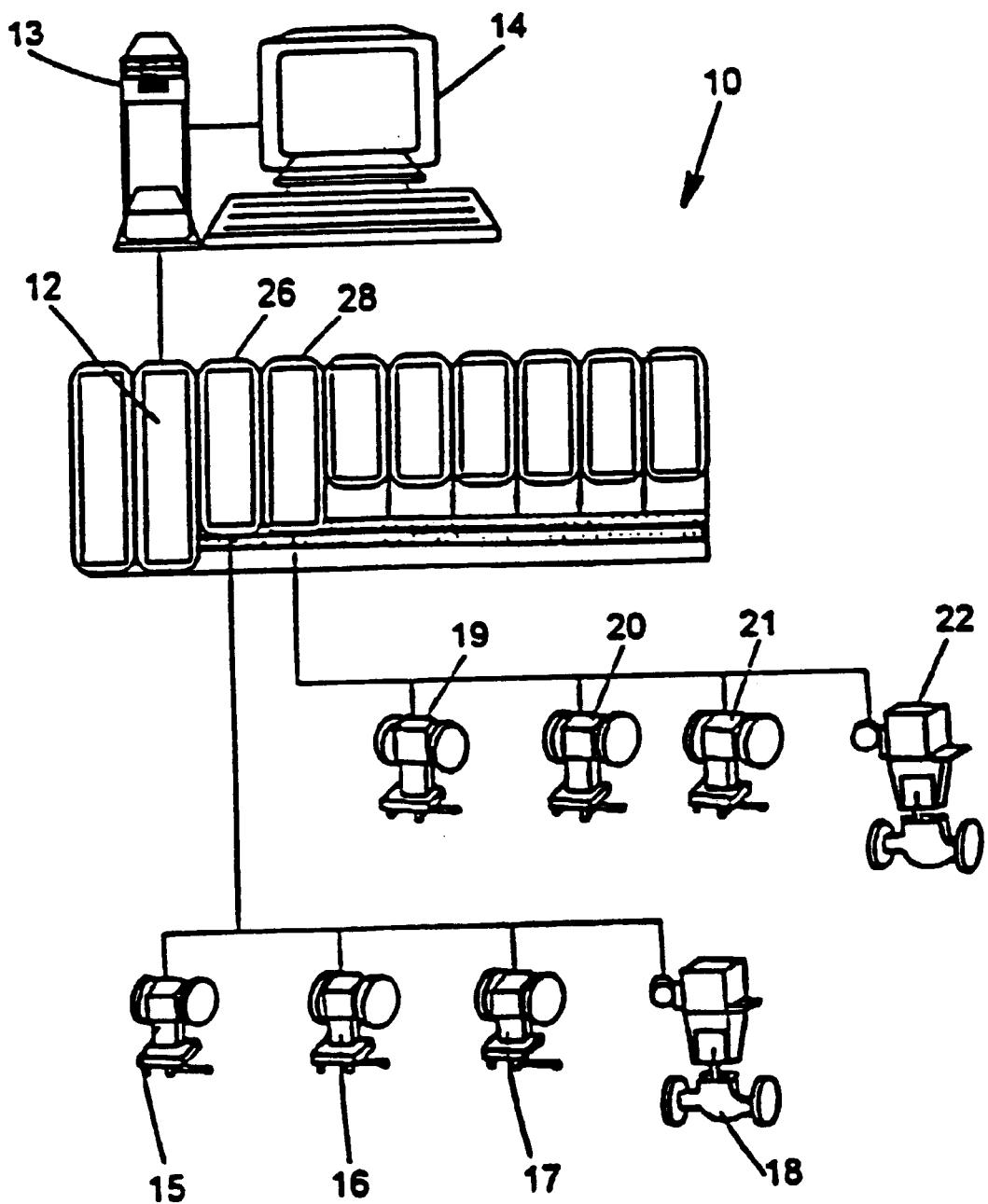
FIG. 1 is a block diagram of a process control system in which a diagnostic tool can be used.

Referring now to FIG. 1, a process control system 10 includes a process controller 12 connected to a host workstation or computer 13 (which may be any type of personal computer or workstation) having a display screen 14 and connected to field devices 15–22 via input/output (I/O) cards 26 and 28. The controller 12, which may be by way of example, the DeltaV™ controller sold by Fisher-Rosemount Systems, Inc., is communicatively connected to the host computer 13 via, for example, an ethernet connection and is communicatively connected to the field devices 15–22 using any desired hardware and software associated with, for example, standard 4–20 ma devices and/or any smart communication protocol such as the Fieldbus protocol. The controller 12 implements or oversees a process control routine stored therein or otherwise associated therewith and communicates with the devices 15–22 and the host computer 13 to control a process in any desired manner.

The field devices 15–22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15–18 are standard 4–20 ma devices that communicate over analog lines to the I/O card 26 while the field devices 19–22 are smart devices, such as Fieldbus field devices, that communicate over a digital bus to the I/O card 28 using Fieldbus protocol communications. Generally speaking, the Fieldbus protocol is an all-digital, serial, two-way communication protocol that provides a standardized physical interface to a two-wire loop or bus that interconnects field devices. The Fieldbus protocol provides, in effect, a local area network for field devices within a process, which enables these field devices to perform process control functions (using function blocks) at locations distributed throughout a process facility and to communicate with one another before and after the performance of these process control functions to implement an overall control strategy. It will be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein. Of course, the field devices 15–22 could conform to any other desired standard(s) or protocols besides the Fieldbus protocol, including any standards or protocols developed in the future.

The controller 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 12, which is typically the case when these function blocks are used for, or are associated with standard 4–20 ma devices and some types of smart field devices, or may be stored in and implemented by the field devices themselves, which is the case with Fieldbus devices. While the description of the control system is provided herein using function block control strategy, the control strategy could also be implemented or designed using other conventions, such as ladder logic.

Figure 2:
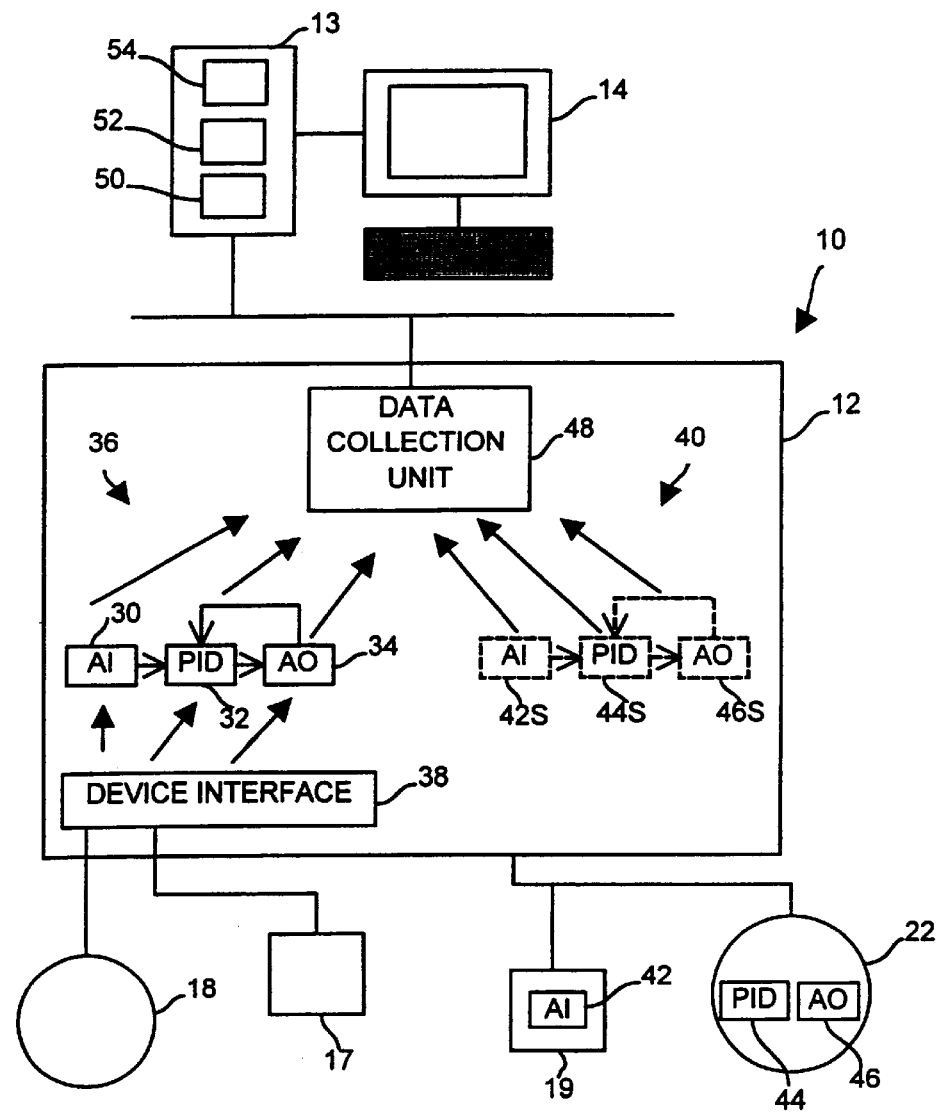
FIG. 2 is a block diagram of a process control system of FIG. 1 illustrating the configuration of two process control loops run in conjunction with a diagnostic tool.

The left side of the controller 12 illustrated in FIG. 2 includes a schematic representation of interconnected function blocks 30, 32, and 34 making up an example process control loop 36 configured to use the standard 4–20 ma devices 17 and 18. Because the function blocks 30, 32 and 34 are related to the operation of 4–20 ma devices, these function blocks are stored in and executed by the controller 12. In a preferred embodiment, in which a DeltaV controller is used, the function blocks 30, 32 and 34 are configured to be similar to, that is, to use the same or similar protocol, as Fieldbus function blocks. However, this convention is not necessary as other function block configurations could be used instead. As illustrated in FIG. 2, the function block 30 is an analog input (AI) function block that provides a measurement made by, for example, the transmitter (sensor) device 17, to the function block 32. The function block 32 is a PID function block that performs calculations using any desired PID strategy and delivers a control signal via a link to the function block 34, which is preferably an analog output (AO) function block. The AO function block 34 communicates with, for example, the valve device 18 to cause the valve 18 to open or close according to the control signal from the PID function block 32. The AO function block 34 also delivers a feedback signal, which may be indicative of the position of the valve 18, to the PID function block 32, which uses this feedback signal to generate the control signal. The controller 12 includes a device interface 38 (which may be implemented in the controller 12 or in the I/O device 26 of FIG. 1) to communicate with the devices 15–18 to get measurements made thereby and to deliver control signals thereto according to the control loop 36 or other control loops. The device interface 38 systematically receives signals from the devices 15–18 and delivers these signals to the proper function block within the controller 12 associated with the sending device. Likewise, the device interface 38 systematically delivers control signals from function blocks within the controller 12 to the proper field device 15–18.

The right side of the controller 12 in FIG. 2 illustrates a sample control loop 40 implemented using Fieldbus function blocks 42, 44 and 46 located down within the Fieldbus field devices 19 and 22. In this instance, the actual function blocks 42, 44, and 46 are stored in and executed by the field devices 19 and 22 and communicate their associated attributes to shadow function blocks 42S, 44S and 46S (illustrated as dotted-line boxes) within the controller 12. The shadow function blocks 42S, 44S and 46S are set up according to the function block configuration used by the controller 12 but mirror the state of the actual function blocks 42, 44 and 46, respectively, so that it appears to the controller 12 that the actual functions associated with the function blocks 42, 44 and 46 are being executed by the controller 12. The use of shadow function blocks within the controller 12 enable the controller 12 to implement a control strategy using function blocks stored in and executed within the controller 12 as well as within field devices. Of course, the controller 12 can implement control loops having both standard function blocks (like function blocks 30, 32 and 34) and shadow function blocks therein. For example, the PID shadow function block 44S, associated with the actual function block 44 in the valve positioner 22, could be linked to the AI function block 30 and the AO function block 34 to form a process control loop. The creation and implementation of shadow function blocks is not the subject of the present invention and is described in more detail in U.S. patent application Ser. No. 09/151,084 entitled "A Shadow Function Block Interface for Use in a Process Control Network," filed Sep. 10, 1998, which is assigned to the assignee of the present invention and the disclosure which is hereby expressly incorporated by reference herein.

In one embodiment of the present invention, the controller 12 includes a diagnostic data collection unit 48 which may be, for example, a short term memory that collects and stores certain kinds of data associated with each of the function blocks (or shadow function blocks) of the process control system 10 for use in detecting problems with those function blocks, or the devices or loops associated with those function blocks. The data collection unit 48 may, for example, collect and store a variability indication, a mode indication, a status indication and/or a limit indication for each of the function blocks within the process control network 10. If desired, the data collection unit 48 may perform some processing on the collected data as described below. The data collection unit 48 periodically sends the collected or processed data to the operator workstation 13 via the ethernet connection for storage in a long term memory or historian 50 and for use by a diagnostic tool 52 located at least partially within the operator workstation 13. The diagnostic tool 52, which is preferably implemented in software stored in a memory of the operator workstation 13 and executed by a processor 54 of the operator workstation 13, detects problems within the process control system 10, reports these problems and suggests tools for use in further analyzing and correcting these problems. If desired, portions of the diagnostic tool software can be executed within the controller 12 or even within the field devices.

The diagnostic tool 52 systematically detects problems using one or more operating parameters of the function blocks or devices within the process control system 10 including, for example, a variability parameter, a mode parameter, a status parameter and a limit parameter determined by (or associated with) each of the function blocks or devices within the process control network 10. An indication of the variability parameter can be calculated or otherwise determined for each device or function block within the process control system (whether those function blocks are implemented within the controller 12 or down within one of the field devices 19–22) to indicate the error between two parameters of the function block. These two parameters may be different signals associated with the function block or may be two different measurements of the same signal. For example, for AI function blocks, the variability indication may indicate the error between a statistical measure (such as the mean, median, etc.) of the measurement made by a sensor over a predetermined amount of time and the actual or instantaneous value of the measurement. Similarly, for an AO function block, the variability indication may be calculated based on the differences between a historical statistical state of a device over a predetermined amount of time (such as the average location of the valve in a valve device) and the current state of the device (such as the current location of the valve). For control function blocks, such as PID, ratio, fuzzy logic function blocks and the like, the variability indication may be based on a deviation of a process parameter input to the function block and a set point or target provided to the function block for that parameter.

In one embodiment, a variability index may be determined as the integrated absolute error (IAE) over a particular interval, such as a ten minute evaluation period. In such a case, the variability index can be calculated as:

$$IAE = \sum_{i=1}^{N} \frac{|X(i) - S|}{N} \quad (1)$$

wherein:
N=the number of samples in the evaluation period;
X(i)=the value of the ith sample of the desired function block parameter, such as the input to the function block for AI blocks and control blocks; and
S=the statistical or target value of the parameter to which the function block parameter is compared, e.g., the set point (for control blocks), the average value of the function block parameter over the last evaluation period (for AI blocks), etc.

If the variation between the X and S variables of equation (1) is Gaussian in nature, then the IAE is equal to the standard deviation times the square root of the product of two over pi. Of course, any other variability indication could be used in addition to or instead of the IAE calculation described above and, thus, the variability indication is not confined to that of equation (1).

Preferably, each function block, and especially those located within the field devices 19–22, automatically calculates a variability indication over each evaluation period (e.g., over a predetermined amount of time or number of execution cycles) and, after each evaluation period, sends the calculated variability indication to the data collection device 48 within the controller 12 or to the data historian 50 within the operator workstation 13. This variation indication may be, for example, the variability index given above or may be subparts thereof which can be used to determine the variability index given above. If the function blocks are Fieldbus function blocks located within one of the field devices 19–22, then the variability indication may be sent to the controller 12 using asynchronous communications. While the final variability index for each function block could be completely calculated by the controller 12 or the operator workstation 13, this would require each function block to send data to such devices after every execution cycle (typically on the order of every 50–100 milliseconds), which would require a lot of additional communications over the buses of the process control network 10. To eliminate this additional communication, it is preferable to design each function block to calculate a variability indication therefor and then send this variability indication over the communication buses once every evaluation period, which will typically be on the order of once every minute, ten minutes or more. Currently, no known standard function blocks provide this capability and, therefore, it should be added to the function blocks used within the process control system 10.

In one embodiment, the calculations for a final variability index associated with a function block are split between the function block and the diagnostic tool 52. In particular, because the computation of the variability index takes computing resources, the most computationally consuming parts of these calculations are done in the workstation 13 or the controller 12. For this discussion, the calculations for a variability index for input and output blocks will be referred to simply as a variability index (VI) while the variability index for control function blocks will be referred to as a control index (CI). The VI (which is used for input blocks, output blocks and control blocks in manual mode) and the CI (which is used for control blocks in auto mode) can be calculated by the workstation 13 or the controller 12 as follows:

$$VI = 1 - \frac{S_{lq} + s}{S_{tot} + s} \quad (2)$$

$$CI = 1 - \frac{S_{lq} + s}{S_{tot} + s} \quad (3)$$

wherein:

$S_{lq}$=minimum standard deviation expected with feedback control;

$S_{tot}$=actual measured standard deviation; and s=sensitivity factor used to make the calculations stable. $S^{lq}$ may be calculated as:

$$S_{lq} = S_{capab} \sqrt{2 - \left[\frac{S_{capab}}{S_{tot}}\right]^2} \quad (4)$$

wherein:

$S_{capab}$=estimated capability standard deviation (standard deviation at process ideal operation).

A small bias value s is added to the $S_{capab}$ and $S_{tot}$ values in equations (2) and (3) because it has been discovered that, if the disturbance to noise signal ratio (i.e., the low frequency to high frequency disturbance ratio) is too high, the VI and CI calculations give too high of values. Fast sampling with very small differences between consecutive measurements also attributes to this problem. The bias value s, it has been found, makes the computations stable. The recommended bias value s is 0.1% of the measurement range (approximately the measurement accuracy). It will be understood that a valve of zero for the VI or CI calculations of equations (2) and (3) is the best case while a value of one is the worst case. However, these or other variability indices could be calculated so that a value of one (or even some other value) is the best case.

If desired, a percent improvement (PI) value can be established for the control blocks as 100 times the CI value for the control block.

To perform the above VI, CI and PI calculations in the most efficient manner possible, each of the function blocks in, for example, the DeltaV environment or the Fieldbus environment may calculate the $S_{capab}$ and $S_{tot}$ values as variability indications and make these values visible to the controller 12, which can then calculate the VI and CI values using equations (2) and (3) or can provide the $S_{capab}$ and $S_{tot}$ values to the diagnostic tool 52 in the workstation 13 which can calculate the VI and CI values. The intermediate calculations needed to determine the $S_{capab}$ and $S_{tot}$ values will be performed during each execution of the function block and the $S_{capab}$ and $S_{tot}$ values will be updated once every N executions of the function block (i.e., once every evaluation period). In one implementation, the $S_{capab}$ and $S_{tot}$ values may be updated after 100 executions of the function block.

The total standard deviation $S_{tot}$ can be calculated in the function block using the so-called moving time window computation as follows:

$$S_{tot} = 1.25 \text{ MAE} \quad (5)$$

wherein MAE is the mean absolute error calculated as:

$$MAE = \frac{1}{N} \sum_{t=1}^{N} |(y(t) - y_{st}| \quad (6)$$

and wherein:

N=the number of executions in an evaluation period;

y(t)=the value of the t'th instantaneous sample of the desired function block parameter, such as the input to the function block; and $y_{st}$=the statistical or target value of the parameter to which the function block parameter is compared, e.g., the average or mean value of the function block parameter over the last evaluation period.

Generally speaking, the process value (PV) of the function block will be used in the I/O blocks to calculate $y_{st}$. In control blocks, either the working setpoint or the PV will be used as $y_{st}$ depending on the block mode.

The capability standard deviation, $S_{capab}$, can be calculated as follows:

$$S_{capab} = \frac{MR}{1.128} \quad (7)$$

wherein MR is the average moving range, which may be calculated as:

$$MR = \frac{1}{N-1} \sum_{t=2}^{N} |(y(t) - y(t-1))| \quad (8)$$

To reduce computations, only the summing component associated with the MAE and MR will be performed during each execution cycle of the function block. The division of the sum by N or N-1 can be performed as part of the $S_{tot}$ and $S_{capab}$ calculations once every N executions (i.e., once every evaluation period). From the above formulas it is evident that:

$$S_{tot} = 1.25 * \frac{1}{N} * Error_{abs} \quad (9)$$

$$S_{capab} = \frac{\frac{1}{N-1} * Delta_{abs}}{1.128} \quad (10)$$

wherein the $Error_{abs}$ and the $Delta_{abs}$ are the summations in equations (6) and (8) respectively and are calculated on an ongoing basis during each execution cycle of the function block.

Of course, the quality of the input to the function block used in these calculations is important and, thus, it is desirable to only use data that has good status and data that is not limited. When using Fieldbus or DeltaV function blocks, the mode variable takes the status of the PV, set point and BackCalibration variables into account, and so the mode variable can be used to assure proper calculations for the variability index. For example, in the OOS (out of service) mode, the $S_{tot}$ and $S_{capab}$ variables are not determined but are, instead, set to the best case value (e.g., zero) to prevent the detection of an error. On warm starts, if the mode changes from OOS to any other mode, the $S_{tot}$ and $S_{capab}$ variables can be set to zero (a best case value), the scan counter can be reset and the $Error_{abs}$ and $Data_{abs}$ variables of equations (9) and (10) can be set to zero. Also, the previous values of y and $y_{st}$ should be reset.

Figure 3:
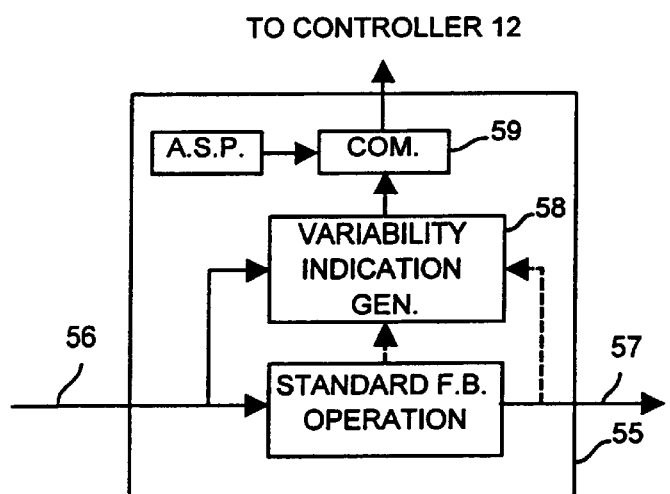
FIG. 3 is a block diagram of a function block having a variability indication generator therein.

FIG. 3 illustrates a function block 55 having an input 56, an output 57 and a variability indication generator 58 connected to the input 56. If desired, the variability indication generator 58 may be additionally or alternatively connected to the output 57 and/or to other parts of the function block 55 to receive other function block parameters or signals (these connections being illustrated by dotted lines in FIG. 3). If the function block 55 is, for example, a control function block, the variability index calculator 58 receives the input 56 (which may be the process value that is being controlled by the loop in which the control block 55 operates) and compares that input to a set point previously supplied to the function block 55. The variability indication generator 58 may determine the variability index according to equation (1) and send that index to a communicator 59 which sends the variability indication to the controller 12 every evaluation period (every N samples). However, as described above, the variability indication generator 58 may determine the $S_{tot}$ and $S_{capab}$ values in the manner described above and send these values to the controller 12 or workstation 13, which can determine the VI and/or CI values therefrom. If the function block 55 is a function block being executed within the controller 12, the controller 12 could include a separate routine to determine the variability indication for each function block, as no bus communications would need to take place after each sample interval. The communicator 59 can be any standard communication unit associated with a function block or a communication protocol.

A second function block operating parameter that may be used to determine problems within the process control system 10 is an indication of the mode in which each of the function blocks (or loops or devices) is operating. In the case of Fieldbus function blocks, as well as some other known function blocks, each function block has a mode parameter that is available to the controller 12 to indicate the mode in which the function block is operating. From this mode indication, a data analyzer within the diagnostic tool 52 can determine a value of the mode parameter to indicate if the function block (and thereby the loop, module or device) is operating in its desired or designed mode or, alternatively, if something has occurred to cause the function block (device or loop) to operate in a different, less preferable mode. Fieldbus function blocks operate in one of a number of modes. For example, AI function blocks operate in an out-of-service mode (wherein an operator may have put the device out-of-service to perform maintenance), a manual mode in which some signal, such as an output of the function block, is being set manually instead of based on the designed operation of the function block, and an automatic mode, in which the function block is operating in a normal manner, i.e., the way in which it was designed to operate. Fieldbus control blocks can also have one or more cascade modes wherein the mode is controlled by other function blocks or by an operator. Typically, Fieldbus function blocks have three modes variables associated therewith at any given time including a target mode, which is the mode in which the operator has set the block to operate (which can be other than the normal or automatic mode), an actual mode, which is the mode in which the control block is actually operating at any given time, and a normal mode, which is the mode in which the function block was designed to operate and is associated with the normal operation of the function block. Of course, these or other mode indications may be used as desired.

The mode indication may be periodically provided to the controller 12 and/or to the operator workstation 13. If the function block is within the controller 12, the mode indication for each function block may be provided to the data collection unit 48 at any desired time or interval. For Fieldbus function blocks or other function blocks within the field devices, the controller 12 may periodically request the mode parameters for each function block using a ViewList request (in the Fieldbus protocol). If desired, the data collection unit 48 within the controller 12 may store the mode at each sampling period or evaluation period and provide the stored data to the data historian 50. Thereafter, the diagnostic tool 52 may determine mode values indicating when or how long the function block spent in the different modes or in a normal mode (or a non-normal mode) or indicating what percent of a specific time period the function block was in a normal mode (or a non-normal mode). Alternatively, the data collection unit 48 or some other specifically designed unit within the controller 12 could detect when each function block is out of its normal mode (by, for example, comparing the function block's normal mode with its actual mode at any given time). In this case, the data collection unit 48 could communicate the mode of any function block by indicating when changes in the mode took place or are detected, which reduces the amount of communication needed between the controller 12 and the operator workstation 13.

A status parameter is another function block operating parameter that may be used to detect problems within process control devices and loops. A status indication provided by each function block may define or identify the status of the primary value (PV) associated with the function block or device. In addition or alternatively, one or more of the inputs and outputs of a function block may have a status indication associated therewith. Fieldbus function blocks have a status parameter associated therewith which can take on the form of "good", "bad" or "uncertain" to indicate the status of the function block PV, inputs and/or outputs. A status indication may also identify or include a limit indication, such as the limits associated with the PV or other function block parameter. Thus, for example, the limit indication may indicate whether the PV of the function block is high or low limited. Again, the diagnostic tool 52 may determine status values or limit values indicating when, how long or what percent of a specific time period the status of the function block was a normal status (or a non-normal status), and when, how long or what percent of a specific time period a function block variable was at one or more limits (or not at the one or more limits), or was a bad status or a questionable status.

Similar to the mode indication, the status indication and the limit indication may be sent by each function block to the controller 12 periodically or on request (using, for example, the ViewList command in the Fieldbus protocol) and changes therein may determined by the controller 12 and sent to the operator workstation 13. Alternatively, the status and limit indications may be sent to the operator workstation 13 without being processed. If desired, the function blocks may be set up to communicate mode, status and/or limit indications only when changes therein actually take place, which further reduces the amount of communications between the controller 12 and the function blocks within field devices. However, when using this communication scheme, the current state of all the required parameters is needed to establish a base against which to compare the changes when the diagnostic tool 52 is first placed on line. This current state may be measured or collected by having the controller 12 periodically report parameter values (even though they have not changed) or by having the diagnostic tool 52 cause the controller 12 to report parameters defined for exception reporting. Based on the status of each of the function blocks, the diagnostic tool 52 can quickly identify measurements which are bad, and need attention (uncertain status) or which have been incorrectly calibrated because they have a measurement or PV that is limited. Of course, the status and limit indications may take on one of any different number and types of values, depending on the type of system in which they are being used.

Furthermore, a status indication may be used for any different variables (other than the PV) of a function block, device or loop. For example, in a control loop having feedback control, the status of the feedback variable may be used to detect problems within function blocks and loops. The status of this feedback variable (e.g., the back calibration or BackCal variable for control or actuator function blocks in the Fieldbus protocol), or any other variable, can be examined by the diagnostic tool 52 to detect when a function block has an output that is limited by, for example, a downstream function block or other downstream condition. Similar to the mode indication, the controller 12 may detect and store actual status values or may store changes in the status values as the status indication.

Other data associated with a process control function block, device or loop may be used to detect problems as well. For example, the operator workstation 13 (or the controller 12) may receive, store and review events and alarms generated by the devices or function blocks within the process control network 10. In, for example, the Fieldbus environment, function blocks support a block error parameter that reports abnormal processing conditions detected by a transducer or a function block. Fieldbus devices reflect any problem that is detected by the device or function block using one of 16 defined bits in a block error bitstream sent to the controller 12. Fieldbus devices report the first detected problem to the controller 12 as an event or alarm and these events or alarms can be forwarded by the controller 12 to an operator workstation 14 event journal. In one embodiment, the diagnostic tool 52 analyzes or reviews the 6th bit of the block error parameter (in the Fieldbus protocol) to detect when a device needs maintenance soon and, thus, when a condition exists that must be addressed but which is not currently limiting device operation. Similarly, the diagnostic tool 52 analyzes the 13th bit of the block error parameter (in the Fieldbus protocol) to determine when correct device operation is not possible because of a condition detected by the device and, thus, immediate action is required. Of course, other events, alarms; other bits within the block error parameter or other types of error indications may be used by the diagnostic tool 52 to detect problems associated with the operation of the process control network 10, and such other events, alarms etc. may be associated with the Fieldbus protocol or any other desired device or controller protocol.

In some instances, function blocks may have parameters, such as mode or status parameters that are set to other than normal or good for reasons unrelated to the correct operation of the process or loop in which these function blocks operate. For example, in batch processes, when a batch is not being run, the modes of the function blocks used within that process are set to non-normal values. However, it would be undesirable to detect these non-normal mode (or status) indications and identify problems with the system based thereon because the batch process is designed to have down times. It is preferable, therefore, to provide each function block (or the module or loop in which it is run) with an application state parameter indicating if the function block (or module) is purposely in a non-normal mode, or has a bad status. In other words, the application state parameter will indicate when alarming or problem detection for the function block should be prevented. For function blocks used in batch processes, for example, the application state parameter will be set to one value to indicate when the function blocks are operating to perform a batch run application and will be set to another value to indicate when the function blocks are purposely not being used to perform a normal function within a batch run application and so no detection of problems should be based on the operations of these function blocks at these times. Such an application state parameter is illustrated in FIG. 3 to be communicated to the controller 12 via the communicator 59. The controller 12 and/or operator workstation 13 may detect the application state parameter for each function block and ignore data (such as variability, mode, status and limit data) associated with function blocks that are in the second category, e.g., that are purposely set to non-normal or bad states, in order to prevent false alarms. Of course, there are other reasons that the application state parameter may be set to prevent detection of problems besides the down time associated with batch processes.

Figure 4:
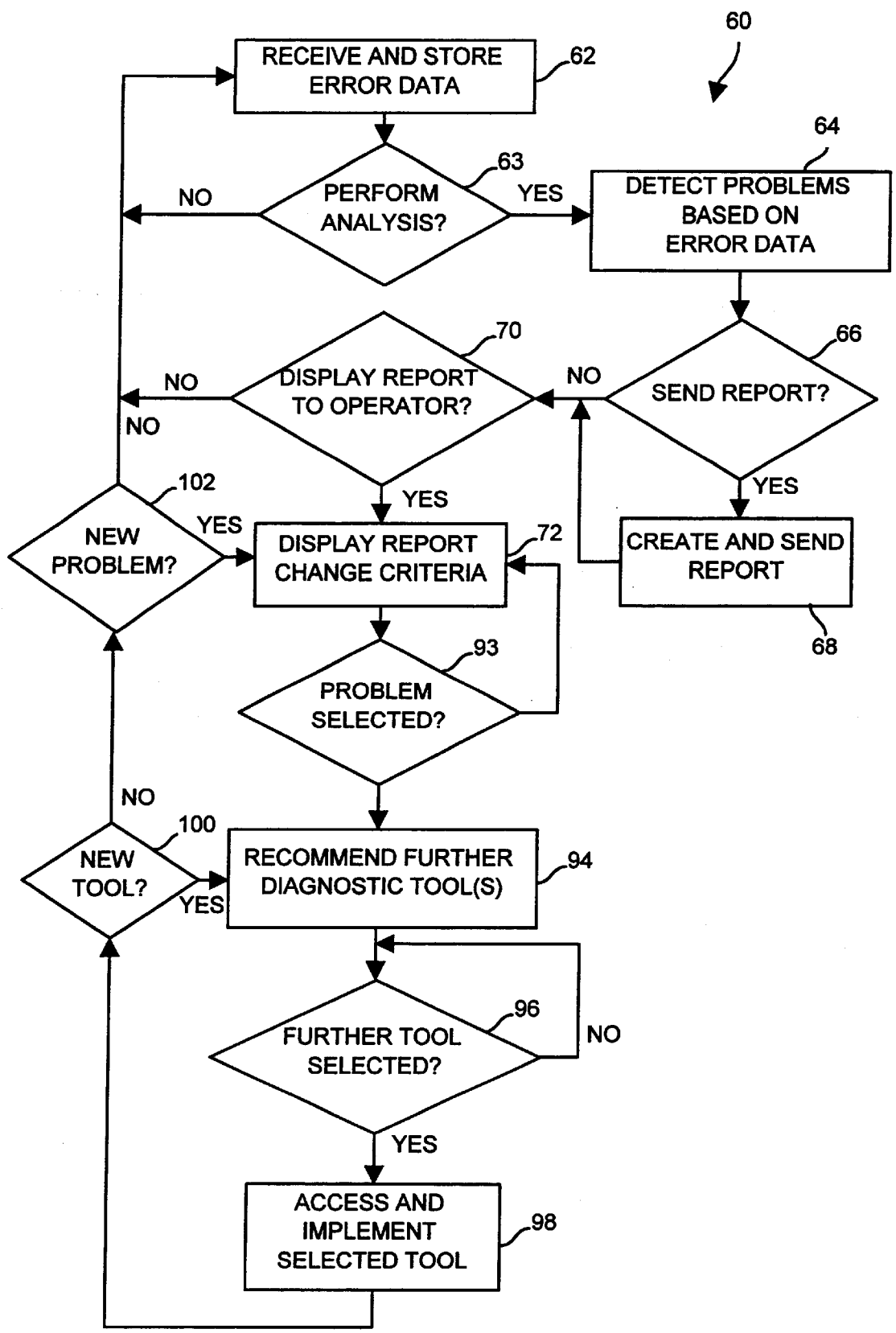
FIG. 4 is a block diagram of a routine implemented by a diagnostic tool to perform diagnostics in the process control system of FIGS. 1 and 2.

The diagnostic tool 52 is preferably implemented in software within the operator workstation 14 and, if necessary, some parts may be implemented in the controller 12 and even down within the field devices, such as the field devices 19–22. FIG. 4 illustrates a block diagram of a software routine 60 that may be executed in the operator workstation 14 to detect and help correct problem function blocks, devices, loops or other entities within the process control network 10. Generally speaking, the software routine 60 collects data pertaining to each of the function blocks within a process, such as variability indication, mode indications, status indications, limit indications, alarm or event information, etc., on an ongoing basis as the process is running and detects the existence of problem measurements, calculations, control loops, etc. based on the collected data. The software routine 60 may send a report or create a display listing each detected problem and its economic impact on plant operation when configured or requested to do so. When viewing a display of the detected problem loops on, for example, the display 14 of the operator workstation 13, an operator can select a particular problem for review or correction. The software routine 60 then suggests and may automatically implement other diagnostic tools to further pinpoint the problem or to correct the problem. In this manner, the diagnostic tool 52 processes data generated by the function blocks or devices of a process control system, automatically recognizes problems based on the data and then suggests and executes other diagnostic tools to further pinpoint the cause of the problem and to correct the problem. This saves the operator enormous amounts of time and effort in detecting and correcting problems within a process control system and also helps to assure that the appropriate diagnostic tools (which may not be totally familiar to the operator) are used to correct the problem.

A block 62 of the routine 60 receives and stores the variability, mode, status, limit, alarm, event and other data used to detect problems within devices, blocks and loops of the process control system 10 on an ongoing basis, i.e., whenever the process is running. Preferably, this data is stored in the data historian 50 within the operator workstation 13. Alternatively, however, this data could be stored in any other desired memory, such an in a memory associated with the controller 12. Likewise, this data may be sent to the operator workstation 13 in any format and may be sent as compressed data, if so desired.

A block 63 detects or determines when an analysis of the data is to be performed because, for example, a periodic report is to be generated or because a user is requesting such an analysis. If no analysis is to be performed, the block 62 simply continues to collect data and may process that data to determine values for the function block operating parameters. If an analysis is to be performed, a block 64 analyzes the stored data or stored parameter values to determine which function blocks, devices or loops may be having problems. Generally speaking, the data may be analyzed based on the current or instantaneous values of the function block operating parameters, or may be analyzed on a historical basis to determine which function blocks, devices or loops are having problems over a specific period of time. The historical analysis helps to detect problems that are long term in nature based on the performance over a specified period of time. To detect a problem, the block 64 may, if necessary, calculate a variability index from the variability indications supplied by the function blocks and then compare the variability index to a specific range or limit (which may be set by the operator) to see if either the instantaneous value of, or some statistical measure of the historical value (such as the average or median value) of the variability index is outside of the range or above or below the specified limit for a function block. If so, a problem may exist and the function block, device or loop associated with the out-of-range variability index is listed as having a problem to be corrected.

Likewise, the block 64 may compare the actual mode of a function block or device with the normal mode of that function block or device to see if they match. As indicated above, the controller 12 may perform this function and send indications of the result, or of mismatches to the historian 50. If desired, however, the operator workstation 13 may perform these comparisons directly. Using the historical data, the block 64 may determine loop utilization, i.e., the percent of time that the loop (or function block) operated in the designed (normal) mode. In the instantaneous analysis, the function block, loop or device may be considered to have a problem when it is currently not operating in the designed or normal mode.

Similarly, the block 64 may analyze the status and limit indication(s) of each function block to determine when the status is bad or uncertain or otherwise not a designed or normal status or when a function block signal is at a limit. A historical analysis may calculate or determine if a particular function block has a status indication that is bad or uncertain for a predetermined percentage of a specified amount of time, may determine which PVs or other variables reached a limit or stayed at a limit for a predetermined percentage of a specified amount of time, or may analyze the status indication or limit indication in any other manner to determine if a problem exists within the function block or device or loop in which a function block is located. Likewise, the block 64 may determine, in an instantaneous evaluation, which function blocks, devices or loops have status values that are currently not in the designed or normal state and/or which signals or variables have reached a limit (i.e., are value limited). The block 64 may review the alarm and event notifications to see if any devices need maintenance, either now or in the future. The blocks which exceed the variability or control index limits and the blocks which have an active bad, limited, or mode condition will be identified and temporarily saved. This summary information can support the creation of "current" summary display. The instantaneous values and conditions can be integrated by the diagnostic tool 52 on, for example, an hour, shift and daily basis to obtain the average value of variability index and the percent improvement and the percent time the bad status, limited signal or non-normal mode condition existed. Of course, the block 64 may perform other types of processing on the variability, mode, status, limit, event, alarm and/or any other desired data to detect problems. Furthermore, the block 64 may run the analysis using different limits, ranges, historical times, etc., all of which may be set by a user or an operator.

For function blocks used in, for example, batch mode processes, data associated with times when a function block intentionally was not operating is discarded or not used in the analysis based on the application state parameter for the function block.

After the block 64 has detected the problems within the process control network, a block 66 determines if any written or electronic reports should be generated because, for example, periodic reports have been requested by a user. If so, a block 68 creates a report listing the problem function blocks, devices, loops, etc. and their economic effect on the process control system. Such an economic impact may be determined by having an operator or other user specify the dollar amount associated with each percentage point of reduced operation of the process or a loop in the process. Then, when a loop is found to have a problem, the actual performance of the process loop may be compared to a known optimum performance value to determine the percentage difference. This percentage difference is then multiplied by the specified dollar amount to percentage point ratio to determine the economic impact in terms of dollars. The report may be printed out on a printing device, displayed on a computer screen (such as the display 14) or other electronic display, sent to a user via E-mail, the Internet or any other local area or wide area network, or may be delivered to a user in any other desired manner. If desired, the diagnostic tool 52 may be configured to automatically notify a plant maintenance system whenever a problem loop is detected and this notification can be sent to the maintenance system as an event using the event/alarm capability of the known OPC interface.

Figures 5, 6, 7:
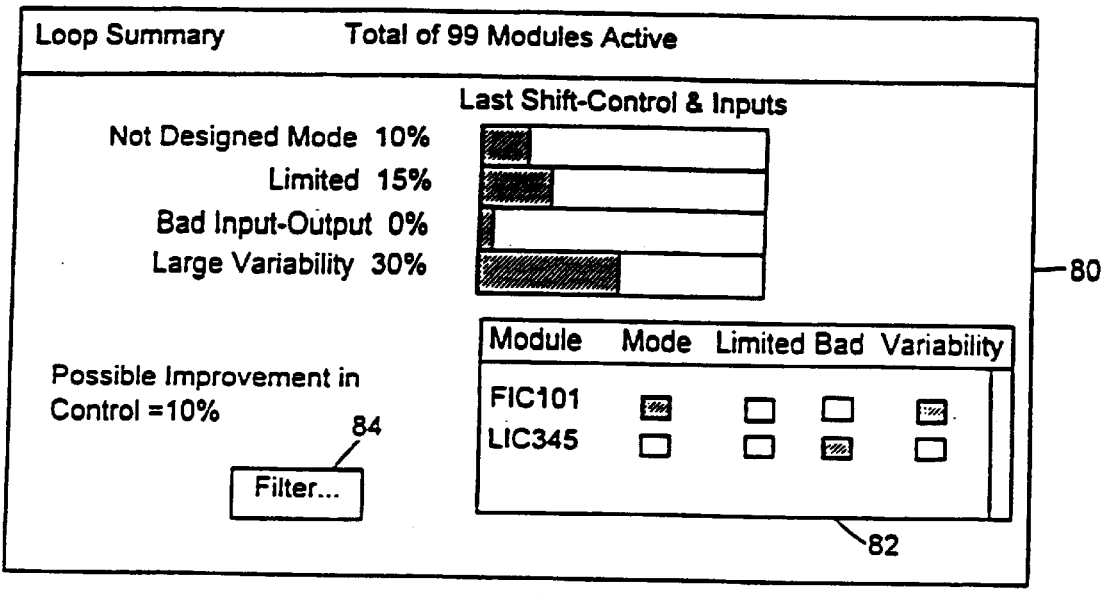
FIG. 5 is a first example screen display generated by the diagnostic tool used in the process control system of FIGS. 1 and 2.
FIG. 6 is a second example screen display generated by the diagnostic tool used in the process control system of FIGS. 1 and 2.
FIG. 7 is a third example screen display generated by the diagnostic tool used in the process control system of FIGS. 1 and 2.

A block 70 determines if an operator has requested an analysis to be performed at the workstation 13 and, if so, a block 72 enters a display or dialog routine that enables a user to find out different information related to the problem or to select different parameters for performing the analysis. In one embodiment, an operator or other person that uses the diagnostic tool 52 is presented with a dialog when he or she logs onto the workstation 13. The dialog summarizes the conditions that need to be addressed in the system without identifying the loops that are the source of the problem. The dialog may convey the information in a graphical format such as on screen display 80 as shown in FIG. 5. The screen display 80 summarizes the percent of total input, output or control function blocks in the process or plant that currently violate the default limits set for utilization (mode), limited signals, bad status or high variability. Because multiple conditions may exist in a single block, the total could potentially exceed 100%. If the total exceeds 100 percent, then the percent for each category can be scaled so that the total equals 100 percent. Modules that have input, output, or control blocks that violate the preset limits are summarized in a tabular list 82. In FIG. 5, module FIC101 has one or more function blocks operating in undesigned modes and one or more function blocks with high variability, while the module LIC345 has one or more function blocks with bad status.

More information about the nature of the problems, such as the limits associated with the function blocks, can be shown graphically by, for example, clicking on a module name within the list 82. Furthermore, by selecting a filter button 84 on the screen of FIG. 5, the user may be presented with a dialog allowing the user to select a summary time frame, the types of blocks to be included in the summary and the limit for each category or block. Such a dialog screen 86 is illustrated in FIG. 6, where the limits for the mode, limited, and bad status of input blocks are set at 99 percent utilization and where the limit for the variability index for input blocks is set at 1.3. In this case, the percent utilization of a block is determined as the percent of a specific time period in which the mode or status is normal and a function block signal was not limited. However, the limits could also be set as the percent of time that the mode or status was non-normal or a function block variable was at a limit, in which case the limits should be set closer to zero. Of course, by choosing all of the loop selections within the screen 86, all modules that include an input, output or control block will be included in the summary.

A Timeframe box 88 of the screen 86 can be manipulated by changing the setting therein to alter the historical time frame for which the analysis is performed. For example, by choosing a "Now" selection within the Timeframe box 88, the instantaneous or current value of the block parameters are used to determine if each module will illustrated as a problem module in the summary list 82. While any time frame may be specified, some example time frames that can be used in filtering are the Current Hour or Last Hour, Current Shift or Last Shift, Current Day or Last Day, etc. For these time frames, a module is included in the summary list only when a detected condition is present for a significant portion (i.e., a predetermined portion) of the selected time frame as defined by the limit condition.

If desired, the user may change the limit values used for variability index, either per block or on a global basis. To facilitate setting variability limits, the user may select the desired limit to be changed and then may be provided with a choice of either editing that limit for a particular block or of setting that limit for all of the blocks simultaneously. When the user wants to set the variability limit for all of the blocks together, the user is presented with a dialog box that allows the variability limit to be set to the current value of a variability plus a specified bias provided by the user. Of course, the limits for variability, mode, status and limited variables may be applied to all of the function blocks within a module, an area, a system, or any other logical unit and may all be changed in a similar manner. Default limits may be initially provided for a configuration as 1.3 for variability index and 99% utilization for mode, limited and status indications. Of course, these default values may be changed from the module summary display as described above.

By selecting a module name within the summary 82 of FIG. 5, the user can be provided a dialog screen having further details related to that module. Such a dialog screen 90 is illustrated in FIG. 7, for the module FIC101 using the Last Shift time frame. The screen 90 illustrates the performance of a PID1 block and an AI1 block within the FIC101 module. The information provided in the screen 90 allows the user to easily identify the particular measurement, actuator, or control block that caused the module to be included in the summary and the percent time that the condition was detected. In particular, the percent of time of the last shift that a block was in its normal mode, normal status and not limited is illustrated in FIG. 7 as loop utilization. Of course, the screen of FIG. 7 could be configured to illustrate the percent of time during the last shift that a block was in a non-normal mode, or had a non-normal status or the percent of time in the last shift that a function block variable was at one or more limits. A measure of variation is shown for the blocks illustrated in FIG. 7 along with limits therefor. The variability measure in this case is calculated so that a value of one is the best case and values greater than one indicate more and more variability error. However, using the CI and VI calculations of equations (2) and (3) for the variability index will cause the variability index to be between zero and one, with zero being the best case. In this case, the variability limit should be set to be between zero and one. Furthermore, the percent improvement (PI) that is possible in a control loop is illustrated in FIG. 7 for control blocks, namely the PID1 block. If desired, the percent utilization values that fall below (or above) the respective limits can be highlighted or otherwise marked to indicate the detected problem(s).

Of course, any other screen display may be used to summarize which loops, devices, function blocks or measurements have a high variability index (such as being greater than a user specified limit), operate in a non-normal mode or have process measurements that have bad or uncertain status or that are limited. As noted above, using an historical analysis, the diagnostic tool 52 may provide displays for a specified time frame to identify devices, loops or function blocks that have a variability index, mode, status or limit variable that has changed significantly from its normal value. Of course, the diagnostic tool 52 may enable a user to choose how many and which tests should be used (and must be failed) before a process control condition is identified as having a problem associated therewith.

Referring again to FIG. 4, when a user selects one of the function blocks in, for example, the display 90 of FIG. 7, a block 93 detects the selection of the problem function block and a block 94 displays a set of options to be used to correct the problem block or loop. For example, for control blocks, the diagnostic tool 52 may allow the user to use an autotuner or other tuner to tune a loop or may allow the user to perform trend analysis on the loop. By selecting the autotuner option, the diagnostic tool 52 automatically finds and executes the autotuner application for the selected control block or loop. However, when the trend option is selected, the workstation 13 will begin to collect trending data as describe hereinafter.

For input or an output function blocks, the block 94 may allow the user to, for example, use a further diagnostic tool for that block or to perform trend analysis. If, for example, the selected input or output block is within a Fieldbus or Hart device, then selecting the diagnostics option will activate the diagnostic application for the associated transducer block using tools known in the art such as any device calibration tools. In a DeltaV environment, the asset management solutions (AMS) diagnostic tool manufactured and sold by Fisher-Rosemount can be used for this purpose to communicate with a device, to obtain specific information therewith and to implement diagnostics associated with the device. Of course, other tools or recommendations could be made as well. For example, for transmitter problems, or function blocks associated with transmitters, the block 94 may recommend that a device calibration be used to calibrate the transmitter while, for a valve, any of the valve diagnostic routines can be used to detect and possibly correct the specific problem within the valve. Generally speaking, the recommendations made by the block 94 may be determined based on whether the problem falls into one of a number of predetermined types of problems, the nature or identity of the source of the problem (e.g. whether it originated in a control or input function block, a transmitter or a valve, etc.) or any other desired criteria. Of course, any desired diagnostic tools can be used, including those now known or those developed in the future.

If the specific nature of the problem is not easily detected from the variability, status, mode, limit or other data that pointed to the existence of a problem, the block 94 can recommend the use of other, more complex diagnostic tools, such as plotting routines, correlation (such as auto-correlation and cross-correlation) routines, spectrum analysis routines, expert analysis routines or any other desired routine or tools provided for the process control system 10. Of course, the diagnostic tool 52 may recommend or suggest the use of more than one tool and allow the operator to choose which tool should be used in any situation. Furthermore, the block 94 may limit its suggestions to tools actually available within the process control network 10, e.g., those loaded onto the operator workstation 13, or may suggest tools that would have to be purchased or loaded into the process control system 10 before being used. Of course, the block 94 can also suggest the use of manual tools, i.e., those which are not run on the operator workstation 13, controller 12 or one of the devices 15–28.

After the block 94 recommends one or more further diagnostic tools, a block 96 waits for a user to select a tool for implementation, and, upon receiving such an instruction from the operator, a block 98 finds and executes the selected tool to enable the operator to further analyze and pinpoint the cause of the problem or to fix the problem. After implementing the diagnostic tool, a block 100 enables the operator to select a different tool for the selected problem and a block 102 enables the operator to select a different problem.

In one embodiment, the block 94 can recommend analysis tools typically referred to as trending applications that require the collection of a relatively large amount and/or a lot of samples of data before being able to be run. Examples of such trending applications include a correlation analysis, a neural network, a fuzzy logic control procedure, an adaptive tuning procedure, a spectrum analysis routine, etc. Unfortunately, when the diagnostic tool 52 detects problems, the data required for the trending tool is typically unavailable because this data was not previously collected. This data may be needed to be collected at a high frequency data rate that is not practically achievable using simple communications between the controller 12 and the workstation 13. As a result, when the operator selects a tool that requires the collection of this data (fast data), the block 98 may automatically configure the controller 12 to collect the necessary data from the process control system 10.

Figure 8:
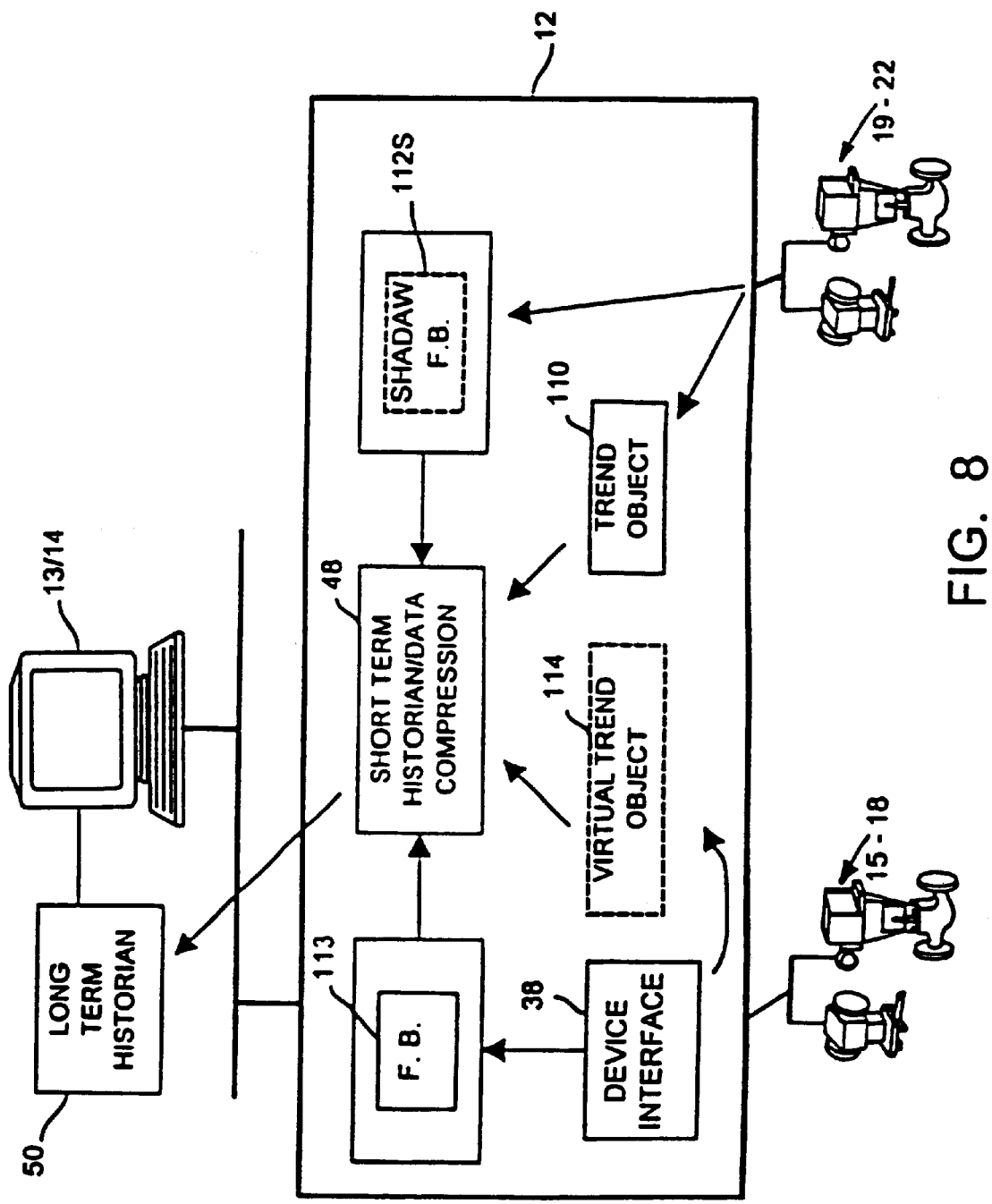
FIG. 8 is a block diagram of the controller and operator workstation of FIGS. 1 and 2, illustrating trending communications associated with a diagnostic tool.

When such data needs to be collected from Fieldbus function blocks or devices, i.e., from the devices via the Fieldbus bus, the controller 12 may use one or more Fieldbus trend objects to collect the data, may bundle and store the collected data as packets of data, and may then send the packets of data to the operator workstation 13 at any desired time so that the fast data is delivered to the operator workstation 13 in a non-time critical manner. This operation reduces the communication load between the controller 12 and the operator workstation 13 for the collection of this data. Typically, a trend object is set up to collect a predetermined number of samples (e.g., 16) of any desired data pertaining to a function block and, when the predetermined number of samples has been collected, these samples are communicated to the controller 12 using asynchronous communications. The use of one or more trend objects 110 for Fieldbus function blocks is illustrated in FIG. 8. The trend object(s) 110 are used to collect and send desired data to the data collection device 48 within the controller 12 and originate within the actual function blocks down within the Fieldbus devices. These trend objects 110 may be provided by the Fieldbus device or by the shadow function blocks (illustrated generally as shadow function blocks 112S in FIG. 8) within the controller 12. Similarly, for function blocks located within and executed by the controller 12 (illustrated generally as function blocks 113 in FIG. 8), virtual trend objects 114 can be set up within the controller 12 to collect the desired data delivered from the 4–20 ma (or other devices). Samples for such virtual trend objects 114 may be collected at any desired rate, such as every 50 milliseconds. The virtual trend objects 114 may be configured to be similar to the actual trend objects of the Fieldbus protocol and are delivered to the data collection device 48. The data collection device 48 delivers the collected data to the data historian 50 within the operator workstation 13 as noted above.

The trend objects 110 and 114 are collected until enough data has been stored to run the desired diagnostic tool. After enough fast data has been collected, the block 98 of FIG. 4 executes or otherwise implements the further diagnostic tool using the collected data so as to perform high level processing and loop analysis.

As described previously, the diagnostic tool 52 displays a set of options to be used to correct a problem loop or block, such as using an autotuner, performing trend analysis, using a further diagnostic tool, and the like. In many instances, providing a list of options is sufficient for the diagnostic tool 52 to enable the user to correct the problem. In order to make the proper selection, the user must be knowledgeable about the process control network and the tools suggested by the diagnostic tool 52. Unfortunately, the user is typically not an expert on either the process control network, the diagnostic tools, or both. While the user may be well versed in some portions of the process control network and the tools, it is impractical to expect the user to understand all aspects of a process control network . that is implemented through thousands of field devices. Moreover, neither the diagnostic tool 52 nor the user evaluates all the relevant data available for determining the proper corrective measures. For example, historical data related to the detection and correction of prior problems is relevant to determining whether alternative corrective measures should be attempted instead of previously attempted measures that were ineffective. Additionally, historical data related to events and alarms is relevant to determine if circumstances other than malfunctions of the field devices and function blocks cause the under-performance of a control loop. The additional data can be evaluated with the necessary expertise by providing an expert engine to continuously evaluate all the relevant data and suggest corrective steps based on all the available relevant information.

Figure 9:
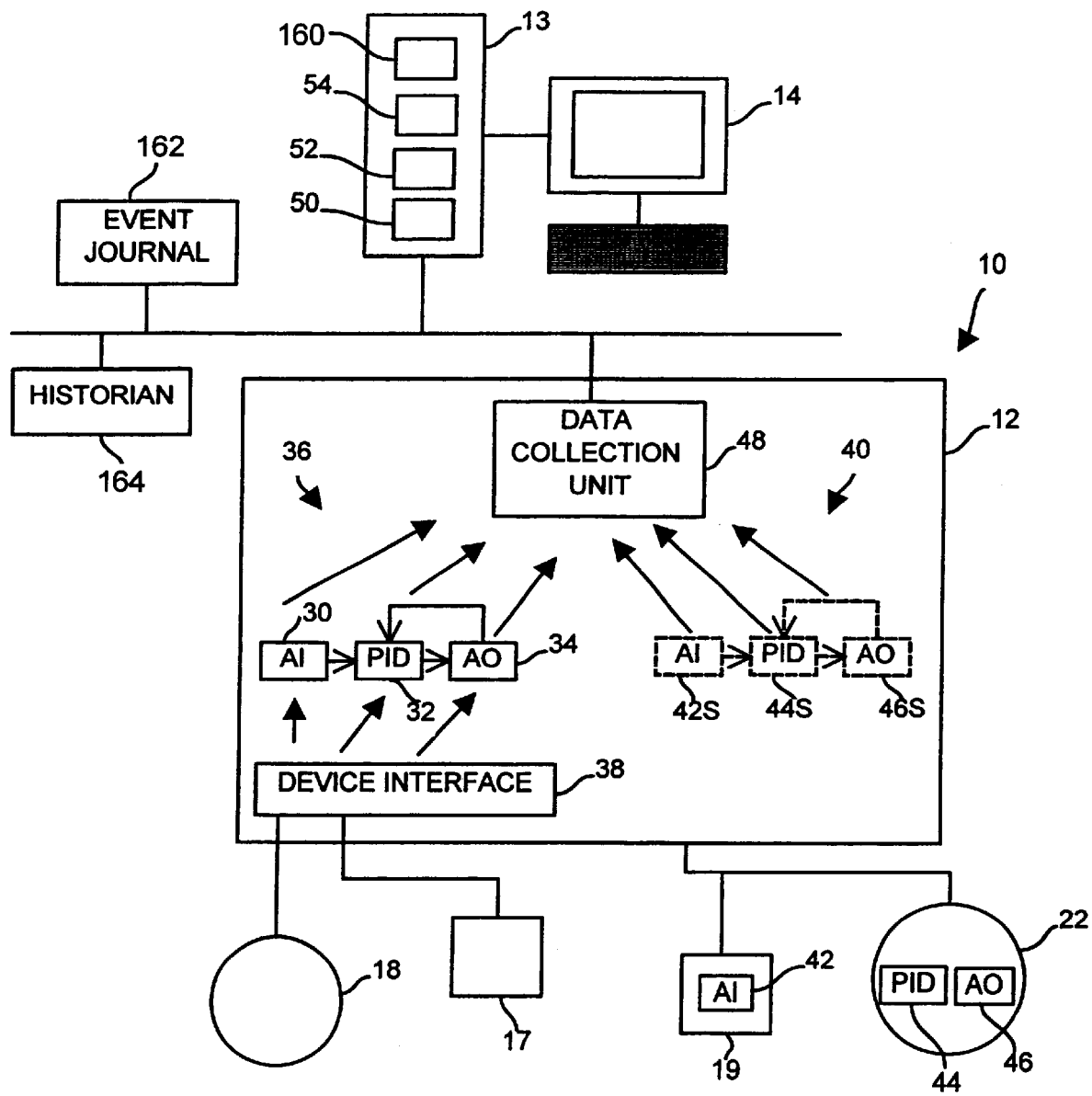
FIG. 9 is a block diagram of the process control system of FIG. 2 further including an expert engine running in conjunction with the diagnostic tool.

FIG. 9 illustrates the process control system 10 of FIG. 2 further including an expert engine 160 implemented in the host workstation 13. The expert engine 160 is preferably implemented as software in memory of the workstation 13, and executed by the processor 54. However, the expert engine 160 could also be implemented as firmware or hardware, if so desired. As shown and described, the expert engine 160 is a separate application within workstation 13 that receives input from the diagnostic tool 52 which develops diagnostic data as previously described. However, the diagnostic tool 52 may be incorporated into expert engine 160, or vice versa, as a single piece of software. Moreover, the expert engine 160 may be partially or wholly implemented in separate workstations having separate processors.

The expert engine 160 can be any standard expert engine software, such as the G2 system sold by Gensym Corp located in Cambridge, Mass. The expert engine 160 may be any other expert engine known today or developed in the future. During installation, the expert engine 160 is configured with rules for analysis to be used in evaluating data relevant to problems arising in the field devices, function blocks, control loops and other control elements of the process control system 10. For example, the expert engine 160 could be configured with a rule for a control loop which specifies that if the control loop is operating in automatic mode and the variability for the loop is high, then the expert engine 160 is to invoke a user interface to notify the user that the control loop needs to be tuned. Of course, the rules for analysis will be dictated by the particular requirements of the process control system 10 in which the expert engine 160 is implemented.

FIG. 9 also shows an event journal 162 which stores event and alarm data. For example, the event journal 162 contains information related to occurrences such as all operator actions changing set points, operating modes, and other system and device parameters, notifications of the need for maintenance of field devices, and the like. Event and alarm data will be input to expert engine 160 for use in determining what steps, if any, are necessary to correct under-performing field devices, function blocks and control loops. The event journal 162 may reside in separate storage device or workstation, or may be part of the information stored in the long-term memory 50 of the operator workstation 13 in which the expert engine 160 is implemented.

The process control system 10 in FIG. 9 also includes a data historian 164 that stores historical information related to, for example, problems previously identified by the diagnostic tool 52 and corrective measures that were taken in response. For example, information regarding the tuning of control function blocks, recalibration of measurement instruments, adjustments to the set points for valve actuators, and the like may be kept in the historian 164. As with the event journal 162, the historian 164 may reside in a separate storage device or workstation, or may be part of information stored in the long-term memory 50.

Figure 10:
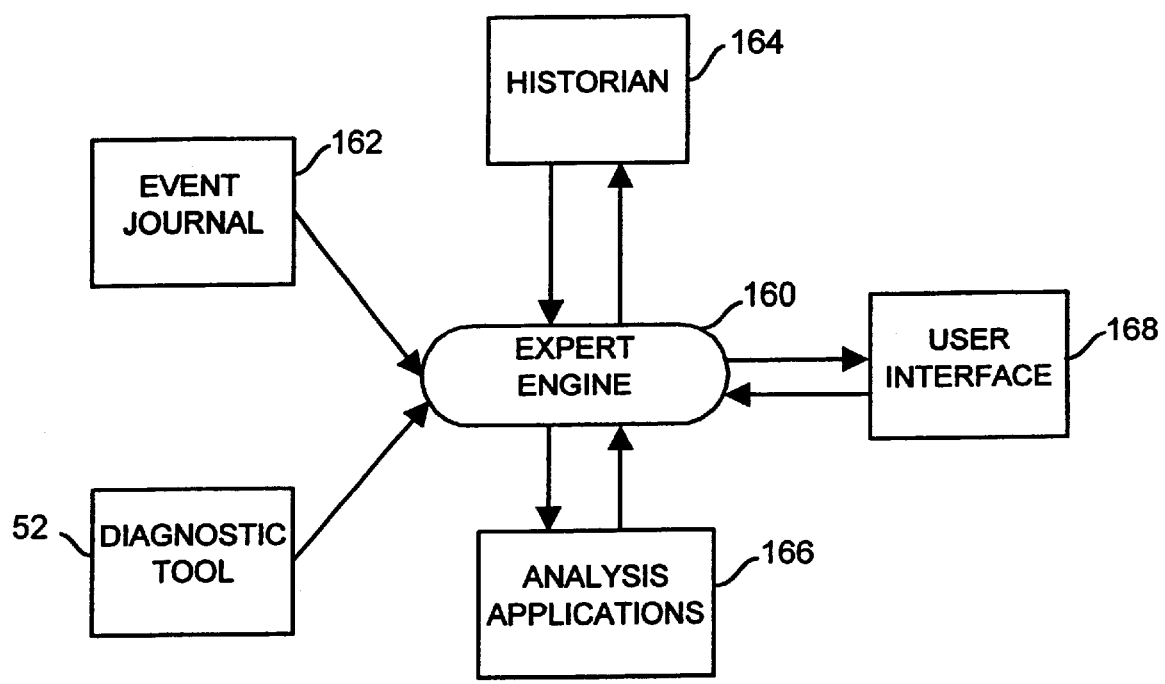
FIG. 10 is a block diagram of the expert engine of FIG. 9.

The expert engine 160 uses the information from the diagnostic tool 52, event journal 162 and historian 164, and the additional analysis applications available at the workstation 13 or accessible in other workstations to detect problems. FIG. 10 illustrates one configuration wherein the expert engine 160 interacts with other components of process control system 10. The expert engine 160 receives input information from the diagnostic tool 52 after the tool 52 analyzes the received error data and detects problems based on the error data in blocks 63 and 64 of FIG. 4. The diagnostic tool 52 then passes to the expert engine 160, at a minimum, the information about the detected problem necessary for the expert engine 160 to determine whether further analysis of the problem and/or corrective measures are required. Upon receiving the information from diagnostic tool 52, the expert engine 160 applies the appropriate rules for analysis for the under-performing field device, function block or control loop based on the rule set of the expert engine 160.

By applying the appropriate rules for analysis to the problem identified by the diagnostic tool 52, the expert engine 160 determines the appropriate steps to take to address the problem. The expert engine 160 may determine that no additional action is required. For example, the expert engine 160 may be configured with a valve actuator analysis rule that compares the variability parameter value to the duration of the variance, such that large variabilities are addressed more urgently than smaller variabilities. The expert engine 160 may determine from the information provided by the diagnostic tool 52 that the variability is small enough for the relevant sample period that the actuator does not require further analysis at the present time. It is also possible that the expert engine 160 will require more information, such as data for a longer time period (e.g., the entire shift, the previous shift, the previous day) to determine whether further action is necessary. The additional data may be obtained by polling the diagnostic tool 52 or the long-term memory 50 or implementing the data collection procedure described previously.

When the expert engine 160 determines further analysis or corrective steps are or may be necessary, the rules for analysis may instruct the expert engine 160 to evaluate additional relevant information to determine the appropriate remedial measures. One resource to which the expert engine 160 may look is the event journal 162. The event journal 162 may contain information for prior events or alarms that may have caused the detected problem. For example, the event journal 162 may have recorded information regarding an emergency shut down of the process control system 10 that would explain a valve actuator or flow-rate sensor operating in an out-of-service mode. The event journal 162 could also have information indicating that a field device was taken out-of-service for maintenance or replacement. This information may explain, for example, why the operation of the device appears to be limited and indicate that the device may have been placed back in service without being calibrated or recalibrated. Consequently, the information in the event journal 162 may dictate an alternative course of action for a problem, or indicate that corrective measures are unnecessary.

The rules for analysis may also direct the expert engine 160 to obtain information from the historian 164. As previously discussed, the historian 164 contains information related to the history of problems identified by the diagnostic tool 52 and the additional analysis performed on, and parameter changes made to, the under-performing field device, function block or control loop. If the historian 164 does not have any historical information related to the detected problem, the expert engine 160 may treat the problem as a new problem, apply the rules for analysis, and implement or suggest the corrective measures based on the data from the diagnostic tool 52. Alternatively, the historical information may indicate that analysis or corrective measures were previously used without success, thereby prompting the expert engine 160 to implement alternative measures. Still further, the historical information may indicate that all remedial measures have been exhausted and the problem persists. In this instance, the expert engine 160 may suggest the user to take action outside the control of the process control system 10 to correct the problem.

Once the expert engine 160 accumulates all the relevant data from the diagnostic tool 52, long-term memory 50, event journal 162 and historian 164, the expert engine 160 applies the rules for analysis to determine the appropriate steps either to identify the source of the problem or to correct the problem. The data and the rules for analysis may dictate the use of further analytical tools to pinpoint the source of the problem. The further analytical tools may include, for example, an autotuner or other tuner for tuning a loop, a tool for performing trend analysis, calibration tools, valve diagnostics routines, correlation routines, spectrum analysis routines, or any other diagnostic tools previously discussed herein or other tools known now or developed in the future. The further diagnostics tools identified by the expert engine 160 may be implemented in the process control system 10 as analysis applications 166 that may be executed by the expert engine 160. The analysis applications 166 may be implemented as source code in the workstations 13 or another workstation, in one or more controllers 12, or in the field devices themselves. The expert engine 160 invokes the necessary analysis application(s) 166 and provides the necessary information. If desired, the expert engine 160 might ask the user if the user will authorize the use of the detected diagnostic tool. Once the analysis application(s) 166 perform the analysis, they return the results of the analysis to the expert engine 160.

Other analysis applications 166 may require additional user input and are not executable solely by the expert engine 160. For these analysis applications 166, the expert engine 160 prompts the user to input the necessary information at a user interface 168 for execution of the analysis application 166. After the user enters the necessary information, the analysis application 166 is invoked either directly by the user interface 168 or through the expert engine 160 and returns the results to the expert engine 160 after performing the analysis. Depending on the complexity of the analysis application 166 and the sophistication of the user, the expert engine 160 and user interface 168 may optionally guide the user through the steps necessary to set up and execute the analysis application 166. For some problems, the expert engine 160 may determine that the proper analysis tools are unavailable and would have to be purchased or loaded into the process control system 10 before being used. For still other problems, the expert engine 160 may determine that manual tools should be used to further analyze and correct the problem. In these instances, the expert engine 160 suggests the implementation of the unavailable and/or manual tools to the user at the user interface 168 and, if the information is available, directs the user through the steps necessary to implement the suggested tools.

Once the expert engine 160 and/or the user executes the identified analysis applications 166, unavailable or external tools, and/or corrective measures, the expert engine 160 updates the historian 164 with information related to the detected problem and the additional analysis and corrective steps taken by the expert engine 160 and/or the user. For corrective measures not controlled by the expert engine 160, such as parameter changes entered by the user through the user interface 168, the relevant information may be transmitted to the historian 168 by another component of the process control system 10 involved in the change, such as the user interface 168, another workstation or controller, or the field device, function block or control loop associated with the changed parameter. The updated information in the historian 164 will be used by the expert engine 160 in analyzing problems that persist or.reoccur some time in the future.

The analysis application 166, tools and corrective measures identified by the expert engine 160 may or may not correct the problem. Consequently, the diagnostic tool 52 and the expert engine 160 will continue to monitor the under-performing field device, function block or control loop. The rules for analysis may instruct the expert engine 160 to evaluate information returned from an analysis application 166 to determine whether the source of the problem has been identified, whether the problem has been corrected, or whether additional analysis and corrective measures are required. If the problem persists and the source of the problem is still unknown, the rules for analysis may instruct the expert engine 160 to implement additional analysis applications 166 and corrective measures. In this way, the user can configure the expert engine 160 to execute an iterative analysis of a problem until the problem is resolved or the source of the problem is pinpointed.

Other problems may not be subject to resolution by an iterative approach implemented solely within the expert engine 160. For example, the expert engine 160 may not receive direct feedback from the unavailable or manual tools. For these problems, the continuous monitoring of the problem is achieved through the normal operation of the diagnostic tool 52. If the problem is corrected, the diagnostic tool 52 will not detect a problem and, consequently, will not notify the expert engine 160 of a detected problem. If the problem persists, however, it is detected by the diagnostic tool 52 and passed on to the expert engine 160 for analysis. Based on the information from the diagnostic tool 52 and in the historian 164, the expert engine 160 applies the rules for analysis to determine the appropriate next step in light of the fact that previous measures were unsuccessful in correcting the problem.

After the expert engine 160 has identified and implemented one or more analysis applications 166 and/or corrective measures, the expert engine 160 may be able to identify the source of the problem with a high degree of certainty. Once the source is pinpointed, the expert engine 160 informs the user of the problem and the source of the problem through the user interface 168. If the user accepts the recommendation or identification of the source of the problem made by the expert engine 160, the user can take the appropriate remedial measures to correct the problem. The expert engine 160 may also be programmed to guide the user through the steps necessary to resolve the problem. For example, if the problem is identified as an incorrect tuning parameter value for filtering, execution period or the like, the expert engine 160 may provide the user with a recommended value for the parameter. For other problems, the recommended solution may include a configuration change to a control loop to, for example, replace PID or feed forward control logic with fuzzy logic. In these instances, the expert engine 160 may direct the user through the steps of replacing the existing control loop logic with the suggested logic and for testing the revised control loop to ensure that it is configured properly.

Inevitably, problems will arise for which the rules for analysis in the expert engine 160 do not provide a solution. These problems may occur where new field devices are installed and rules for analysis are not provided in the expert engine 160 to address problems with the new device, or a problem occurs within an existing device or control loop that was not anticipated when the rules for analysis of the expert engine 160 were set up. In these instances, the expert engine 160 notifies the user via the user interface 168 that the problem exists, that the expert engine 160 does not have a recommended course of action, and that intervention by the user or someone else knowledgeable about the process control system 10 is required. Likewise, the expert engine 160 may have learning capabilities and add new rules based on actions taken by a user. If desired, new rules may be added to the expert engine 160 for use in determining and correcting problems within a process control system.

Preferably, the expert engine 160 runs constantly in the background evaluating problems detected by the diagnostic tool 52. With the expert engine 160 running in the background, the problems can be addressed by the expert engine 160 as they arise in the process control system 10 and thereby be corrected as quickly as possible. However, some implementations of the expert engine 160 may not allow the expert engine 160 to evaluate all problems as it runs in the background. For example, the volume of information in the process control system 10 and limitations on the processing capabilities of the workstation 13 may prevent the expert engine 160 from addressing all the problems arising during peak operations periods. In these situations, some or all of the problems may be queued up for handling by the expert engine 160 in an asynchronous or batch mode during non-peak operating hours, or analysis by the expert engine 160 may be initiated upon the occurrence of a triggering event, such as turning off a pump. Moreover, the rules for analysis in the expert engine 160 may be set up to prioritize the problems that may arise in the process control system 10 so the expert engine 160 can analyze urgent or high priority problems as they arise and postpone analysis of less critical problems until a time when they may be handled more efficiently. Of course, the expert engine 160 can also be run on a separate processor to assure it has enough processing power to run in the background. In other instances, the user may execute the expert engine 160 to run at any desired time.

Implementation of the expert engine 160 in a process control system 10 provides a more efficient and potentially more reliable mechanism for resolving problems that arise in the process control network 10. In this manner, the expert engine 160 uses all the available relevant information to analyze the detected problem and to arrive at a recommended solution to the problem. The expert engine 160 preferably runs continuously in the background to address problems as they arise, but may also be initiated by a triggering event or an automatic scheduler so that the problems are addressed in an efficient manner. This saves time on the part of the user and does not require the user to have a great deal of expertise in solving problems in loops and devices. Moreover, the expert engine 160 is able to more quickly and efficiently accumulate and analyze all the data that is relevant to solving the detected problem. Besides saving time, the expert engine 160 reduces the burden on the user and helps assure that the proper diagnostics tools and remedial measures are used in each circumstance and are implemented correctly.

While the diagnostic tool 52 and expert engine 160 have been described as being used in conjunction with Fieldbus and standard 4–20 ma devices, they can be implemented using any other external process control communication protocol and may be used with any other types of function blocks or devices having function blocks therein. Moreover, it is noted that the use of the expression "function block" herein is not limited to what the Fieldbus protocol or the DeltaV controller protocol identifies as a function block but, instead, includes any other type of block, program, hardware, firmware, etc., associated with any type of control system and/or communication protocol that can be used to implement some process control function. While function blocks typically take the form of objects within an object oriented programming environment, this need not be case.

Although the diagnostic tool 52 and the expert engine 160 described herein are preferably implemented in software, they may be implemented in hardware, firmware, etc., and may be implemented by any other processor associated with the process control system 10. Thus, the routines 52 and 160 described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the internet, etc. (which are viewed as being the same as or interchangeable with providing such software via a transportable storage medium). Also, while the expert engine 160 is described as a rule-bated expert, other types of expert engines could be used as well, including for example, data mining systems, etc.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system having a plurality of field devices communicatively linked to a bus, each field device having at least one process function module being adapted to perform process control functions and to transmit process control information on the bus, the process control system comprising:

a diagnostic tool communicatively linked to the bus, the diagnostic tool being adapted to receive the process control information from the process function module, to analyze the process control information, to determine an operational problem in the process control system based on the analysis of the process control information, and to transmit information relating to the operational problem; and an expert engine communicatively linked to the bus and configured with analysis rules for determining corrective actions for the process control system based on information related to operational problems, the expert engine being adapted to receive the information relating to the operational problem transmitted by the diagnostic tool, to analyze the information relating to the operational problem using a corresponding one of the analysis rules, to determine a corrective action for the process control system based on the analysis of the information relating to the operational problem with the analysis rule, and to transmit information relating to the corrective action for implementation of the corrective action by the process control system.

2. The process control system of claim 1, comprising a database communicatively linked to the expert engine and being configured to store historical information for operational problems and corrective actions, the database being adapted to transmit historical information relating to the operational problem determined by the diagnostics tool to the expert engine for use by the expert engine analyzing the information relating to the operational problem and determining the corrective action.

3. The process control system of claim 2, wherein the historical information stored in the database includes event information.

4. The process control system of claim 3, wherein the event information includes information pertaining to the need to perform maintenance on at least one of the field devices.

5. The process control system of claim 3, wherein the event information includes information pertaining to changes to operating parameters for the process function modules.

6. The process control system of claim 2, wherein the historical information stored in the database includes alarm information.

7. The process control system of claim 2, wherein the database is configured to store values of process function module operating parameters for each of the process function modules.

8. The process control system of claim 2, wherein the database is configured to store information relating to changes to process control functions performed by process function modules of the process control system.

9. The process control system of claim 2, wherein the expert engine transmits the information relating to the corrective action to the database, and wherein the database is adapted to receive the information relating to the corrective action and to store the information relating to the corrective action therein.

10. The process control system of claim 1, comprising an analysis application communicatively linked to the expert engine, wherein the expert engine transmits the information relating to the corrective action to the analysis application, and wherein the analysis application analyzes the information relating to the corrective action and transmits information relating to the analysis of the analysis application to the expert engine.

11. The process control system of claim 10, wherein the analysis application is one of a tuner, a calibrator and a second diagnostic tool.

12. The process control system of claim 10, wherein the expert engine is adapted to receive the information relating to the analysis of the analysis application, to analyze the information relating to the analysis of the analysis application using the analysis rule, to determine a second corrective action for the process control system based on the analysis of the information relating to the analysis of the analysis application with the analysis rule, and to transmit information relating to the second corrective action.

13. The process control system of claim 1, wherein the process control system includes a user interface, and wherein the expert engine transmits the information relating to the corrective action to the user interface.

14. The process control system of claim 13, wherein the expert engine transmits information to the user interface relating to the probable source of the operational problem.

15. The process control system of claim 13, wherein the expert engine transmits information to the user interface relating to a recommended further tool to use to correct the operational problem.

16. The process control system of claim 15, wherein the expert engine transmits information to the user interface relating to operating the recommended further tool.

17. The process control system of claim 1, wherein the expert engine is adapted to determine the corrective action for the operational problem automatically.

18. The process control system of claim 1, wherein the expert engine is adapted to operate continuously during the execution of process control functions by the process control modules of the field devices of the process control system.

19. The process control system of claim 1, wherein the expert engine is adapted to determine the corrective action for the operational problem in response to a triggering event.

20. A diagnostic system for use in a process control system that includes a first processor, a second processor and a plurality of field devices communicatively linked to a bus, each field device having at least one process function module being adapted to perform process control functions and to transmit process control information on the bus, the diagnostic system comprising:

a first computer readable memory;

a first routine stored in the first computer readable memory and adapted to be implemented on the first processor, wherein the first routine;

receives the process control information from the process function module, analyzes the process control information, determines an operational problem in the process control system based on the analysis of the process control information, and transmits information relating to the operational problem;

a second computer readable memory; and a second routine stored in the second computer readable memory and adapted to be implemented on the second processor, wherein the second routine:

receives the information relating to the operational problem transmitted by the first routine, analyzes the information relating to the operational problem using a corresponding one of at least one analysis rules for determining corrective actions for the process control system based on information related to operational problems, determines a corrective action for the process control system based on the analysis of the information relating to the operational problem with the analysis rule, and transmits information relating to the corrective action for implementation of the corrective action by the process control system.

21. The diagnostic system of claim 20, wherein the process control system includes a third processor, the diagnostic system comprising:

a third computer readable memory; and a third routine stored on the third computer readable memory and adapted to be implemented on the third processor, wherein the third routine:

stores historical information for operational problems and corrective action, and transmits historical information relating to operational problem determined by the first routine to the second routine for use by the second routine in analyzing the information relating to the operational problem and determining the corrective action.

22. The diagnostic system of claim 21, wherein the historical information stored by the third routine includes event information.

23. The diagnostic system of claim 22, wherein the event information includes information pertaining to the need to perform maintenance on at least one of the field devices.

24. The diagnostic system of claim 22, wherein the event information includes information pertaining to changes to operating parameters for the process function modules.

25. The diagnostic system of claim 21, wherein the historical information stored by the third routine includes alarm information.

26. The diagnostic system of claim 21, wherein the third routine stores values of process function module operating parameters for each of the process function modules.

27. The diagnostic system of claim 21, wherein the third routine stores information relating to changes to process control functions performed by process function modules of the process control system.

28. The diagnostic system of claim 21, wherein the second routine transmits the information relating to the corrective action to the third routine, and wherein the third routine receives the information relating to the corrective action and stores the information relating to the corrective action.

29. The diagnostic system of claim 21, wherein the first processor, the second processor and the third processor are the same processor, and the first computer readable memory, the second computer readable memory and the third computer readable memory are the same memory.

30. The diagnostic system of claim 20, wherein the process control system includes a fourth processor, the diagnostic system comprising:
a fourth computer readable memory; and
a fourth routine stored on the fourth computer readable memory and adapted to be implemented on the fourth processor, wherein the second routine transmits the information relating to the corrective action to the fourth routine, and wherein the fourth routine:
analyzes the information relating to the corrective action, and
transmits information relating to the analysis of the fourth routine to the second routine.

31. The diagnostic system of claim 30, wherein the fourth routine is one of a tuner, a calibrator and a diagnostic tool.

32. The diagnostic system of claim 30, wherein the second routine receives the information relating to the analysis of the fourth routine, analyzes the information relating to the analysis of the fourth routine using the analysis rule, determines a second corrective action for the process control system based on the analysis of the information relating to the analysis of the fourth routine with the analysis rule, and transmits information relating to the second corrective action.

33. The diagnostic system of claim 30, wherein the first processor, the second processor and the fourth processor are the same processor, and the first computer readable memory, the second computer readable memory and the fourth computer readable memory are the same memory.

34. The diagnostic system of claim 20, wherein the process control system includes a fifth processor, the diagnostic system comprising:
a fifth computer readable memory; and
a fifth routine stored on the fifth computer readable memory and adapted to be implemented on the fifth processor, wherein the second routine transmits the information relating to the corrective action to the fifth routine, and wherein the fifth routine:
receives the information relating to the corrective action; and
displays the information relating to the corrective action.

35. The diagnostic system of claim 34, wherein the second routine transmits information to the fifth routine relating to the probable source of the operational problem.

36. The diagnostic system of claim 34, wherein the second routine transmits information to the fifth routine relating to a recommended diagnostic tool to use to correct t the operational problem.

37. The diagnostic system of claim 36, wherein the second routine transmits information to the fifth routine relating to operating of the recommended diagnostic tool.

38. The diagnostic system of claim 34, wherein the first processor, the second processor and the fifth processor are the same processor, and the first computer readable memory, the second computer readable memory and the fifth computer readable memory are the same memory.

39. The diagnostic system of claim 22, wherein the second routine determines the corrective action for the operational problem automatically.

40. The diagnostic system of claim 22, wherein the second routine executes continuously during the execution of process control functions by the process control modules of the field devices of the process control system.

41. The process control system of claim 22, wherein the second routine determines the corrective action for the operational problem in response to a triggering event.

42. A method of diagnosing and correcting operational problems in a process control system having a plurality of field devices communicatively linked to a bus, each field device having at least one process function module being adapted to perform process control functions and to transmit process control information on the bus, the diagnostic system comprising:
receiving the process control information from the process function modules at a diagnostic tool;
analyzing the process control information;
determining an operational problem in the process control system based on the analysis of the process control information;
transmitting information relating to the operational problem to an expert engine;
analyzing the information relating to the operational problem using a corresponding one of at least one analysis rules for determining corrective actions for the process control system based on information related to operational problems;
determining a corrective action for the process control system based on the analysis of the information relating to the operational problem with the analysis rule; and
transmitting information relating to the corrective action for implementation by the process control system.

43. The method of claim 42, comprising:
storing historical information for operational problems and corrective action in a database; and
transmitting historical information relating to the determined operational problem to the expert engine for use by the expert engine in analyzing the information relating to the operational problem and determining the corrective action.

44. The method of claim 43, wherein the historical information stored by the database includes event information.

45. The method of claim 44, wherein the event information includes information pertaining to the need to perform maintenance on at least one of the field devices.

46. The method of claim 44, wherein the event information includes information pertaining to changes to operating parameters for the process function modules.

47. The method of claim 43, wherein the historical information stored by the database includes alarm information.

48. The method of claim 43, comprising storing values of process function module operating parameters for each of the process function modules in the database.

49. The method of claim 43, comprising storing information relating to changes to process control functions performed by process function modules of the process control system in the database.

50. The method of claim 43, comprising storing the information relating to the corrective action in the database.

51. The method of claim 42, comprising:

transmitting the information relating to the corrective action to an analysis application;

analyzing the information relating to the corrective action; and transmitting information relating to the analysis of the analysis application to the expert engine.

52. The method of claim 51, wherein the analysis application is one of a tuner, a calibrator and a second diagnostic tool.

53. The method of claim 51, comprising:

receiving the information relating to the analysis of the analysis application at the expert engine;

analyzing the information relating to the analysis of the analysis application using the analysis rule;

determining a second corrective action for the process control system based on the analysis of the information relating to the analysis of the analysis application with the analysis rule; and transmitting information relating to the second corrective action for implementation b the process control system.

54. The method of claim 42, comprising:

transmitting the information relating to the corrective action to a user interface; and receiving the information relating to the corrective action at the user interface.

55. The method of claim 54, comprising transmitting information to the user interface relating to the probable source of the operational problem.

56. The method of claim 54, comprising transmitting information to the user interface relating to a recommended further diagnostic tool to use to correct the operational problem.

57. The method of claim 56, comprising transmitting information to the user interface relating to operating of the recommended further diagnostic tool.

58. The method of claim 42, comprising determining the corrective action for the operational problem automatically.

59. The method of claim 42, comprising operating the expert engine continuously during the execution of process control functions by the process control modules of the field devices of the process control system.

60. The method system of claim 42, comprising determining the corrective action for the operational problem in response to a triggering event.

* * * * *

UNITED STATES PATENT AND TRADEMARK OFFICE
CERTIFICATE OF CORRECTION

PATENT NO. : 6,633,782 B1
DATED : October 14, 2003
INVENTOR(S) : Trevor D. Schleiss et al.

It is certified that error appears in the above-identified patent and that said Letters Patent is hereby corrected as shown below:

<u>Title page,</u>
Item [75], Inventors, please delete "Suresh Ganesamoorthi" and insert -- Suresh Sai Ganesamoorthi --.
Item [56], References Cited, U.S. PATENT DOCUMENTS, please add the following references:
--

| | | | |
|---|---|---|---|
| 4,843,557 | 6/89 | Ina et al. | 364/431.77 |
| 5,122,979 | 6/92 | Bellows et al. | 364/550 |
| 4,819,233 | 4/89 | Delucia et al. | 714/710 |
| 5,200,028 | 6/91 | Edmonds et al. | 714/736 |
| 5,200,958 | 4/93 | Hamilton et al. | 714/710 |
| 4,517,468 | 5/85 | Kemper et al. | 290/52 |
| 4,530,234 | 7/85 | Cullick et al. | 73/53 |
| 4,635,214 | 1/87 | Kasai et al. | 364/551 |
| 4,642,782 | 2/87 | Kemper et al. | 364/550 |
| 4,644,479 | 2/87 | Kemper et al. | 364/550 |
| 4,649,515 | 3/87 | Thompson et al. | 364/900 |
| 4,707,796 | 11/87 | Calabro et al. | 364/552 |
| 4,777,585 | 10/88 | Kokawa et al. | 364/164 |
| 4,831,564 | 5/89 | Suga | 364/551.01 |
| 4,873,655 | 10/89 | Kondraske | 364/553 |
| 4,907,167 | 3/90 | Skeirik | 364/500 |
| 4,924,418 | 5/90 | Bachman et al. | 364/550 |
| 4,934,196 | 6/90 | Romano | 73/861.38 |
| 4,964,125 | 10/90 | Kim | 371/15.1 |
| 4,992,965 | 2/91 | Hölter et al. | 364/551.01 |
| 5,005,142 | 4/91 | Lipchak et al. | 364/550 |
| 5,043,862 | 8/91 | Takahashi et al. | 364/162 |
| 5,053,815 | 10/91 | Wendell | 355/208 |
| 5,081,598 | 1/92 | Bellows et al. | 364/550 |
| 5,089,984 | 2/92 | Struger et al. | 395/650 |

UNITED STATES PATENT AND TRADEMARK OFFICE
CERTIFICATE OF CORRECTION

PATENT NO. : 6,633,782 B1
DATED : October 14, 2003
INVENTOR(S) : Trevor D. Schleiss et al.

It is certified that error appears in the above-identified patent and that said Letters Patent is hereby corrected as shown below:

U.S. PATENT DOCUMENTS, cont'd.,

| | | | |
|---|---|---|---|
| 5,098,197 | 3/92 | Shepard et al. | 374/120 |
| 5,099,436 | 3/92 | McCown et al. | 364/550 |
| 5,103,409 | 4/92 | Shimizu et al. | 364/556 |
| 5,111,531 | 5/92 | Grayson et al. | 395/23 |
| 5,121,467 | 6/92 | Skeirik | 395/11 |
| 5,122,976 | 6/92 | Bellows et al. | 364/550 |
| 5,130,936 | 7/92 | Sheppard et al. | 364/551.01 |
| 5,134,574 | 7/92 | Beaverstock et al. | 364/551.01 |
| 5,142,612 | 8/92 | Skeirik | 395/11 |
| 5,148,378 | 9/92 | Shibayama et al. | 364/571.07 |
| 5,167,009 | 11/92 | Skeirik | 395/27 |
| 5,175,678 | 12/92 | Frerichs et al. | 364/148 |
| 5,193,143 | 3/93 | Kaemmerer et al. | 395/51 |
| 5,197,114 | 3/93 | Skeirik | 395/22 |
| 5,197,328 | 3/93 | Fitzgerald | 73/168 |
| 5,212,765 | 5/93 | Skeirik | 395/11 |
| 5,214,582 | 5/93 | Gray | 364/424.03 |
| 5,224,203 | 6/93 | Skeirik | 395/22 |
| 5,228,780 | 7/93 | Shepard et al. | 374/175 |
| 5,235,527 | 8/93 | Ogawa et al. | 364/571.05 |
| 5,265,031 | 11/93 | Malczewski | 364/497 |
| 5,265,222 | 11/93 | Nishiya et al. | 395/3 |
| 5,274,572 | 12/93 | O'Neill et al. | 364/550 |
| 5,282,131 | 1/94 | Rudd et al. | 364/164 |

UNITED STATES PATENT AND TRADEMARK OFFICE
CERTIFICATE OF CORRECTION

PATENT NO.   : 6,633,782 B1
DATED        : October 14, 2003
INVENTOR(S)  : Trevor D. Schleiss et al.

It is certified that error appears in the above-identified patent and that said Letters Patent is hereby corrected as shown below:

OTHER PUBLICATIONS, "Gensym Corporation Web page" reference, please delete "g2diagosticassistant.com" and insert -- g2diagnosticassistant.com --.

Column 1,
Line 45, please delete "to.control" and insert -- to control --.

Column 7,
Line 35, please delete "processed.data" and insert -- processed data --.

Column 10,
Line 7, please delete " $MAE = \frac{1}{N} \sum_{t=1}^{N} | (y(t) - y_{st}|$ " and insert -- $MAE = \frac{1}{N} \sum_{t=1}^{N} | (y(t) - y_{st})|$ --.

Column 12,
Line 60, please delete "may determined" and insert -- may be determined --.

Column 13,
Line 55, please delete "alarms;" and insert -- alarms, --.

Column 17,
Line 34, please delete "will illustrated" and insert -- will be illustrated --.

Column 18,
Line 51, please delete "as describe hereinafter." and insert -- as described hereinafter. --.

Column 20,
Line 46, please delete "network . that" and insert -- network that --.

Column 23,
Line 60, please delete "or.reoccur" and insert -- or reoccur --.

UNITED STATES PATENT AND TRADEMARK OFFICE
CERTIFICATE OF CORRECTION

PATENT NO.   : 6,633,782 B1
DATED        : October 14, 2003
INVENTOR(S)  : Trevor D. Schleiss et al.

It is certified that error appears in the above-identified patent and that said Letters Patent is hereby corrected as shown below:

Column 25,
Line 63, please delete "not be case." and insert -- not be the case --.

Column 29,
Line 61, please delete "correct t the" and insert -- correct the --.

Signed and Sealed this

Seventh Day of September, 2004

JON W. DUDAS
*Director of the United States Patent and Trademark Office*